(12) United States Patent
Moeschler et al.

(10) Patent No.: US 10,787,220 B2
(45) Date of Patent: Sep. 29, 2020

(54) HANDLEBAR AND GRIP APPARATUS AND SYSTEM

(71) Applicant: PADLOC, LLC, Reno, NV (US)

(72) Inventors: Jason Moeschler, Nevada City, CA (US); Christian Feucht, Nevada City, NV (US); Evan Smith, Nevada City, CA (US); Mark Slate, San Rafael, CA (US); Patrick M. Seidler, Mill Valley, CA (US); Raphael Schlanger, Wilton, CT (US)

( * ) Notice: Subject to any disclaimer, the term of this patent is extended or adjusted under 35 U.S.C. 154(b) by 0 days.

(21) Appl. No.: 14/909,722

(22) PCT Filed: May 6, 2015

(86) PCT No.: PCT/US2015/029524
§ 371 (c)(1),
(2) Date: Feb. 2, 2016

(87) PCT Pub. No.: WO2015/179132
PCT Pub. Date: Nov. 26, 2015

(65) Prior Publication Data
US 2017/0057589 A1    Mar. 2, 2017

Related U.S. Application Data

(60) Provisional application No. 61/996,920, filed on May 19, 2014.

(51) Int. Cl.
*B62K 21/26* (2006.01)
*B62K 21/12* (2006.01)

(52) U.S. Cl.
CPC .............. *B62K 21/26* (2013.01); *B62K 21/12* (2013.01)

(58) Field of Classification Search
CPC .......... B62K 21/12; B62K 21/26; B62K 23/04
See application file for complete search history.

(56) References Cited

U.S. PATENT DOCUMENTS

| 245,542 | A | * | 8/1881 | Moran | ................... | B62K 21/26 |
| | | | | | | 74/551.9 |
| 1,020,462 | A | * | 3/1912 | Snoe | ...................... | B62K 21/26 |
| | | | | | | 74/551.9 |

(Continued)

FOREIGN PATENT DOCUMENTS

| BE | 403041 | 5/1934 |
| CH | 122492 | 9/1927 |

(Continued)

OTHER PUBLICATIONS

International Search Report for PCT/US15/29524, dated Dec. 29, 2015.

(Continued)

*Primary Examiner* — Adam D Rogers
(74) *Attorney, Agent, or Firm* — Michael A. Blake

(57) ABSTRACT

A handlebar-grip system and apparatus comprising: a handlebar, the handlebar comprising: a center portion, a handle attached to a first end of the center portion, the handle comprising: a handle outboard and extending along an axial axis; a handle engaging geometry located on the handle outboard end, the handle engaging geometry is noncircular about the axial axis; a grip configured to slide onto the handle outboard end, the grip comprising: a grip central opening; a grip engaging geometry located in the grip central opening; a first portion that is circumferentially offset and axially coincident relative to a second portion thereof, where the first portion has a greater radial thickness than the second portion; where, with the handle positioned within the grip central opening, the grip is circumferentially keyed to (Continued)

the handle to limit rotation therebetween about the axial axis.

17 Claims, 14 Drawing Sheets

(56) References Cited

U.S. PATENT DOCUMENTS

| | | | | |
|---|---|---|---|---|
| 2,358,737 | A | * | 9/1944 | Schwinn ................ B62K 21/14 403/203 |
| 3,189,069 | A | * | 6/1965 | Stowell .................... B25G 1/00 16/421 |
| 4,941,369 | A | * | 7/1990 | Specht ...................... B62J 3/00 74/551.8 |
| 5,421,220 | A | | 6/1995 | Chen |
| 6,035,742 | A | | 3/2000 | Hollingsworth |
| 6,421,879 | B1 | * | 7/2002 | Gratz .................... B62K 21/26 16/422 |
| 6,615,688 | B2 | | 9/2003 | Wessel |
| 6,923,089 | B2 | | 8/2005 | Wu |
| 6,964,214 | B2 | | 11/2005 | Wu |
| 7,219,395 | B2 | * | 5/2007 | Bigolin ................. B62K 21/26 16/421 |
| 7,814,812 | B1 | | 10/2010 | Ziegahn |
| 8,234,952 | B2 | | 8/2012 | Ting |
| 8,250,714 | B2 | | 8/2012 | Ming-Chang |
| 8,365,635 | B2 | | 2/2013 | Grimes |
| 8,448,299 | B1 | | 5/2013 | Li |
| 8,484,806 | B2 | | 7/2013 | Rarick |
| 8,680,436 | B2 | | 3/2014 | Schmauder |
| 9,061,728 | B2 | * | 6/2015 | Galstad ................. B62K 21/12 |
| 9,580,133 | B2 | * | 2/2017 | Aymar .................. B62K 21/26 |
| 9,952,618 | B2 | * | 4/2018 | Stewart ................. B62K 21/26 |
| 2004/0134304 | A1 | | 7/2004 | Wu |
| 2005/0039565 | A1 | * | 2/2005 | Minkow ................ B62K 21/26 74/551.9 |
| 2006/0032326 | A1 | | 2/2006 | Griswold |
| 2010/0058558 | A1 | | 3/2010 | Wang |
| 2011/0219909 | A1 | | 9/2011 | Galstad |
| 2011/0277586 | A1 | * | 11/2011 | Yu ........................... B62K 21/26 74/551.9 |
| 2012/0073400 | A1 | * | 3/2012 | Wang ..................... B62K 21/26 74/551.9 |
| 2012/0234130 | A1 | * | 9/2012 | Yu ........................... B62K 21/26 74/551.9 |
| 2016/0339983 | A1 | * | 11/2016 | Liao ....................... B62K 21/26 |

FOREIGN PATENT DOCUMENTS

| | | | |
|---|---|---|---|
| CN | 2319724 | | 3/1999 |
| DE | 202009011344 | | 11/2009 |
| DE | 202016105720 U1 | * | 1/2018 ............. B62K 21/26 |
| EP | 1832318 | | 9/2007 |
| EP | 2500248 A1 | | 9/2012 |
| FR | 911073 A | * | 6/1946 ............. B62K 21/14 |
| GB | 633839 A | * | 12/1949 ............. B62K 21/26 |
| JP | S5566891 | | 5/1980 |
| JP | S58188388 | | 12/1983 |
| JP | S60121985 | | 8/1985 |
| JP | 2004148988 | | 5/2004 |
| TW | M299692 | | 10/2006 |
| WO | WO2004108511 | | 12/2004 |

OTHER PUBLICATIONS

Molina Encabo, Aitor, Supplementary European Search Report, EP15795488, PCT/US2015029524, dated Dec. 21, 2017.

* cited by examiner

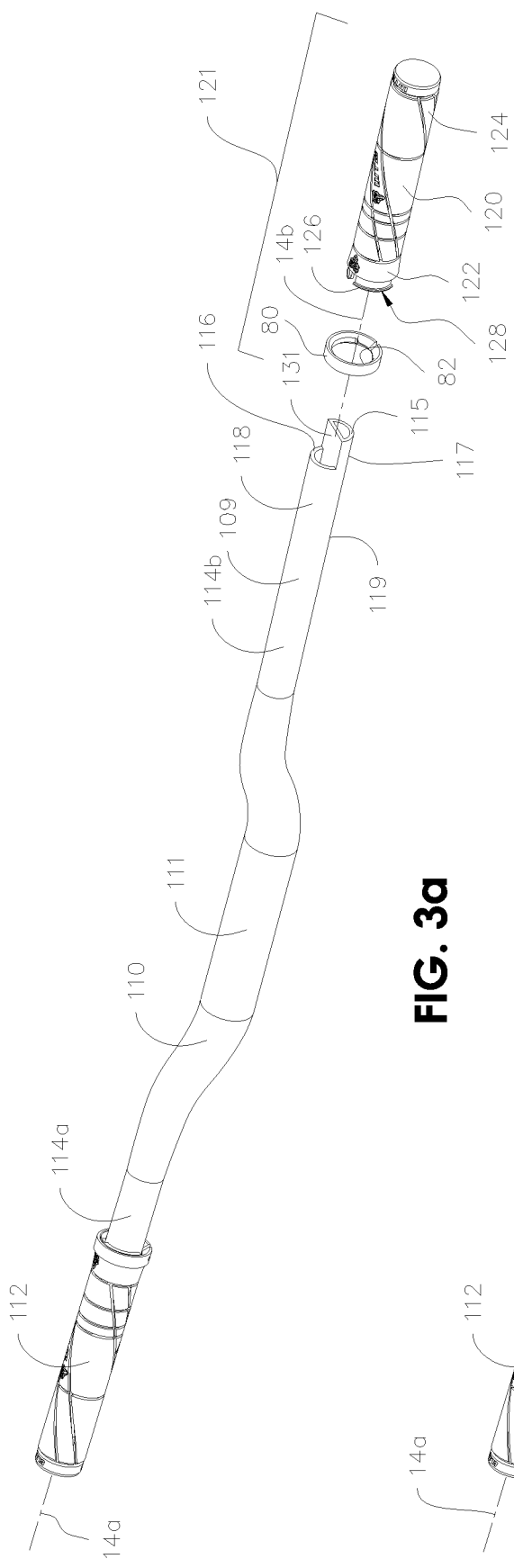
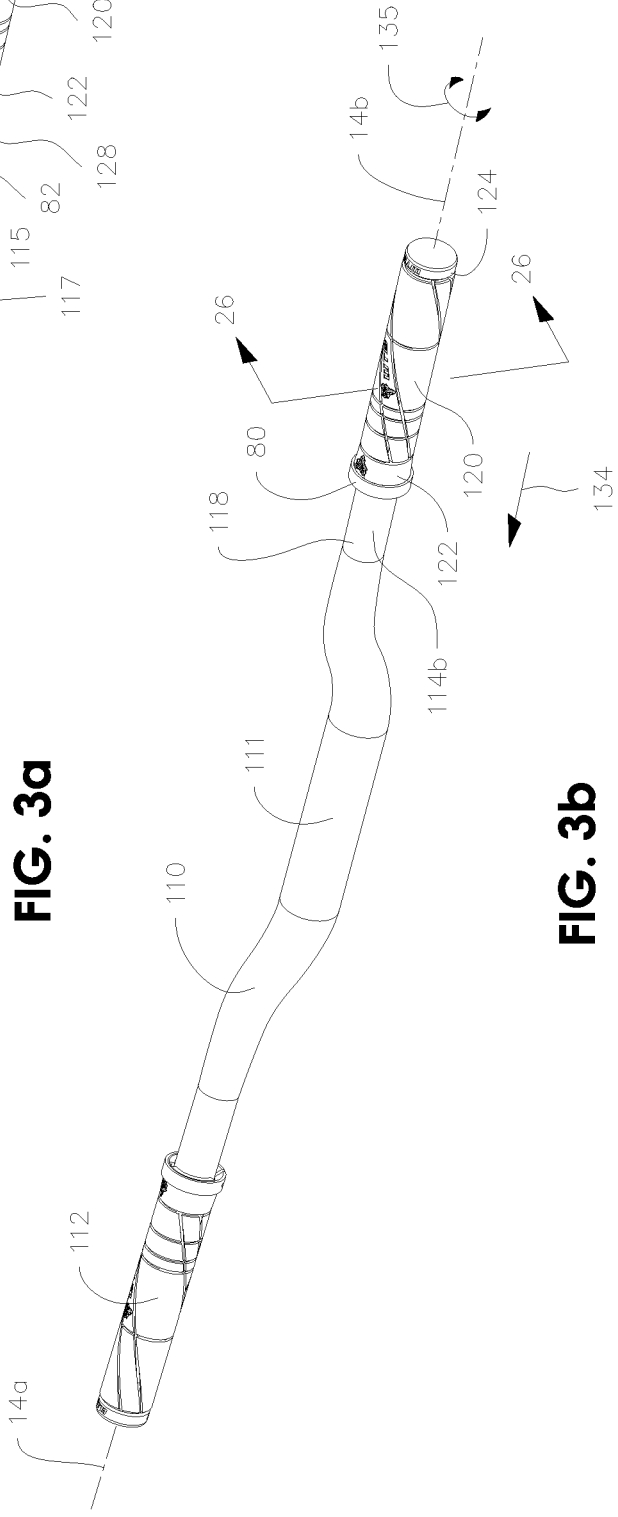
FIG. 3a
FIG. 3b

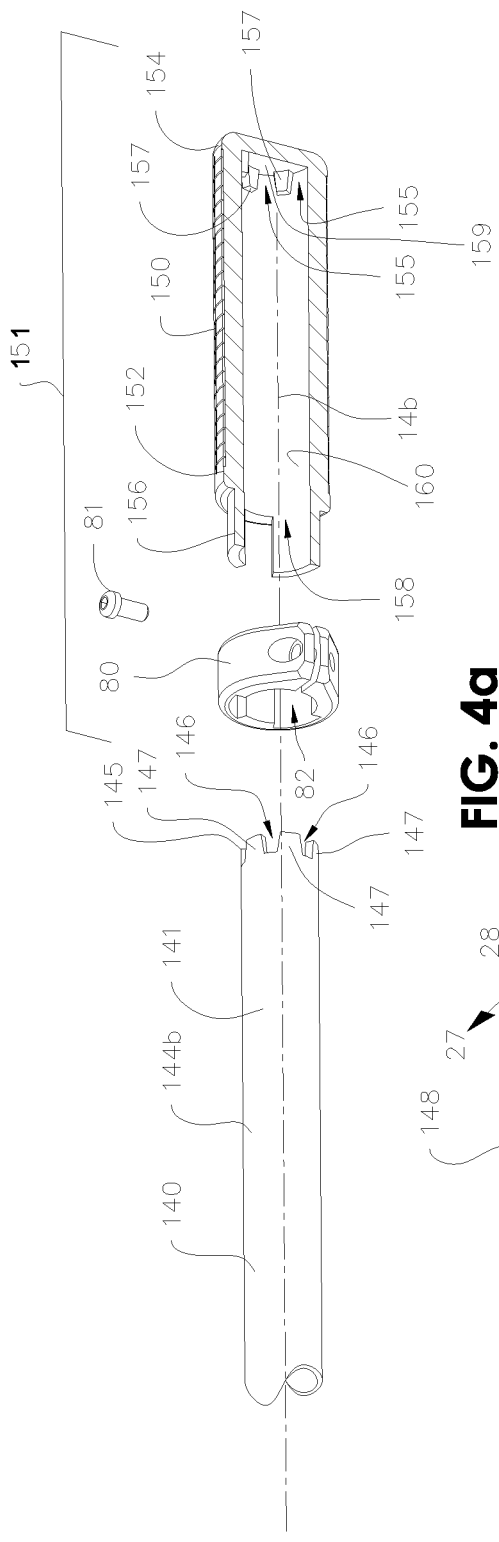
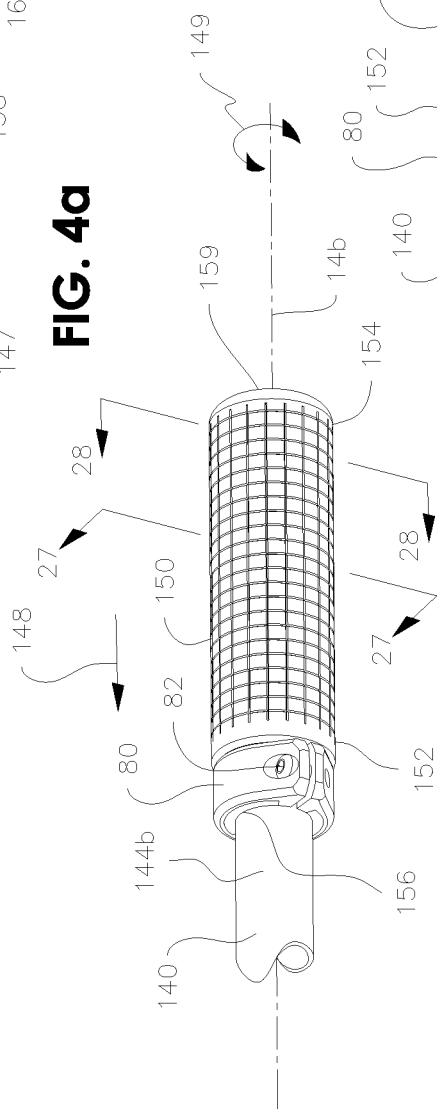
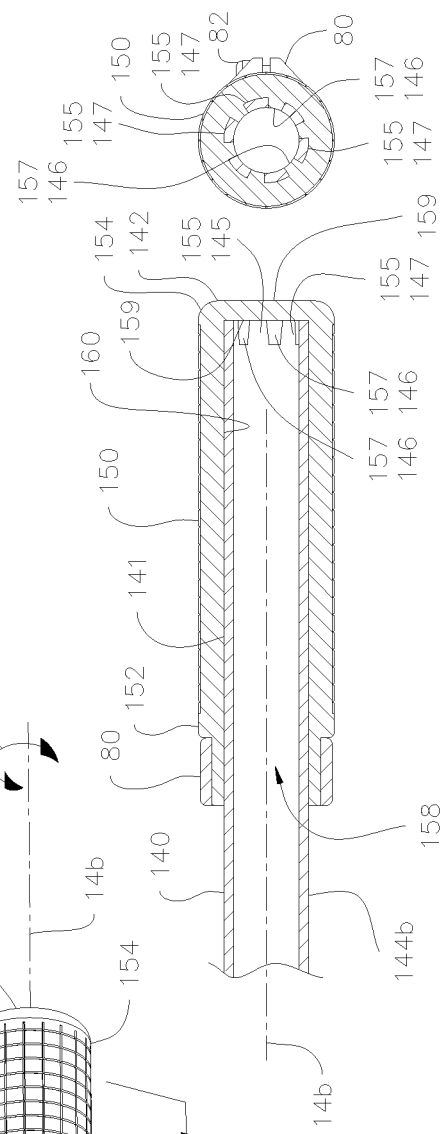
FIG. 4a
FIG. 4b
FIG. 4c
FIG. 4d

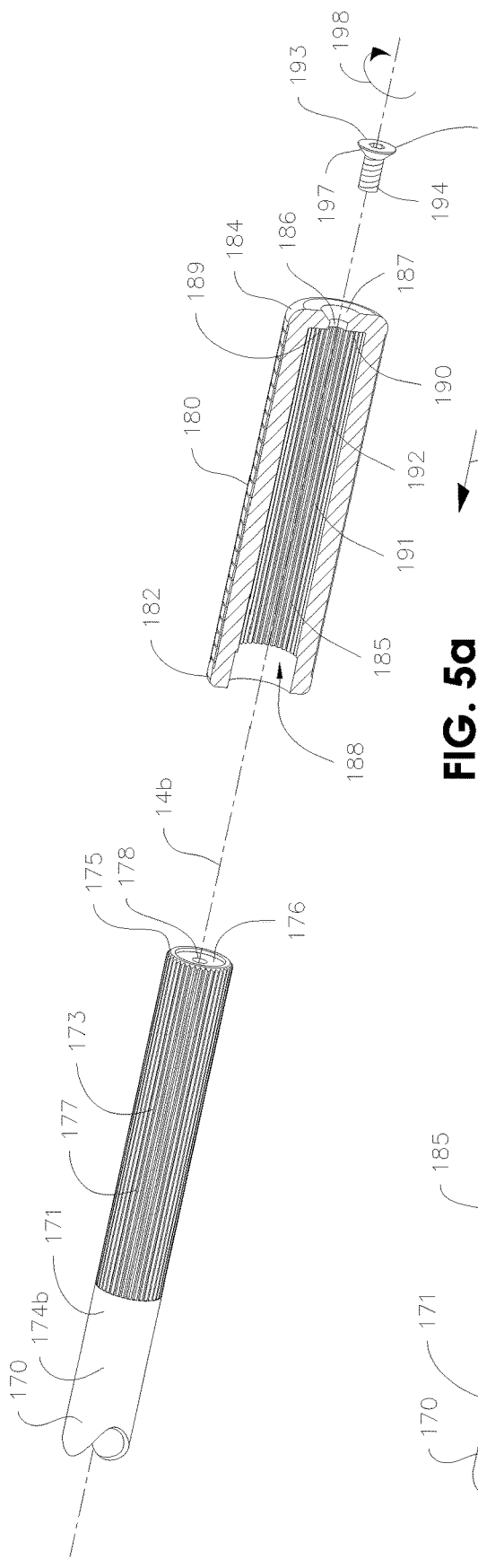
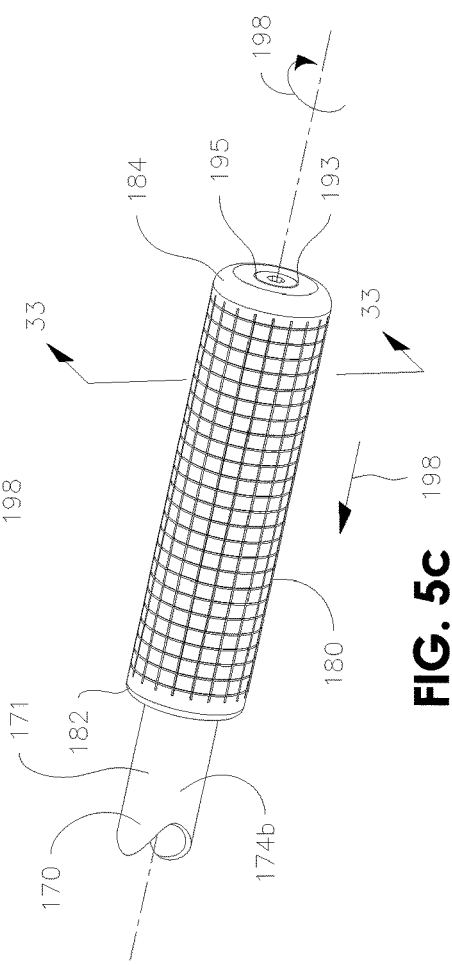
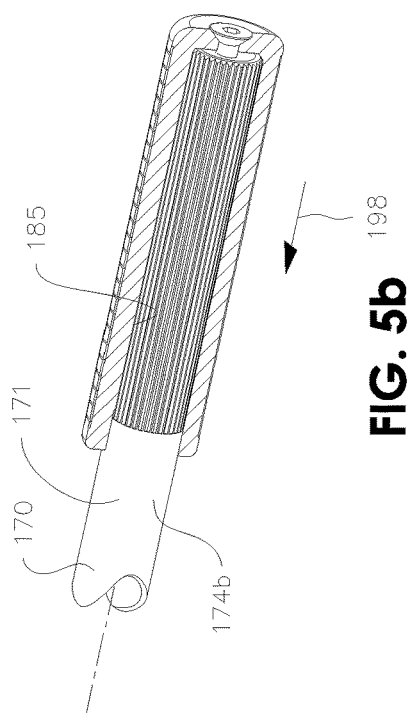
FIG. 5a
FIG. 5b
FIG. 5c

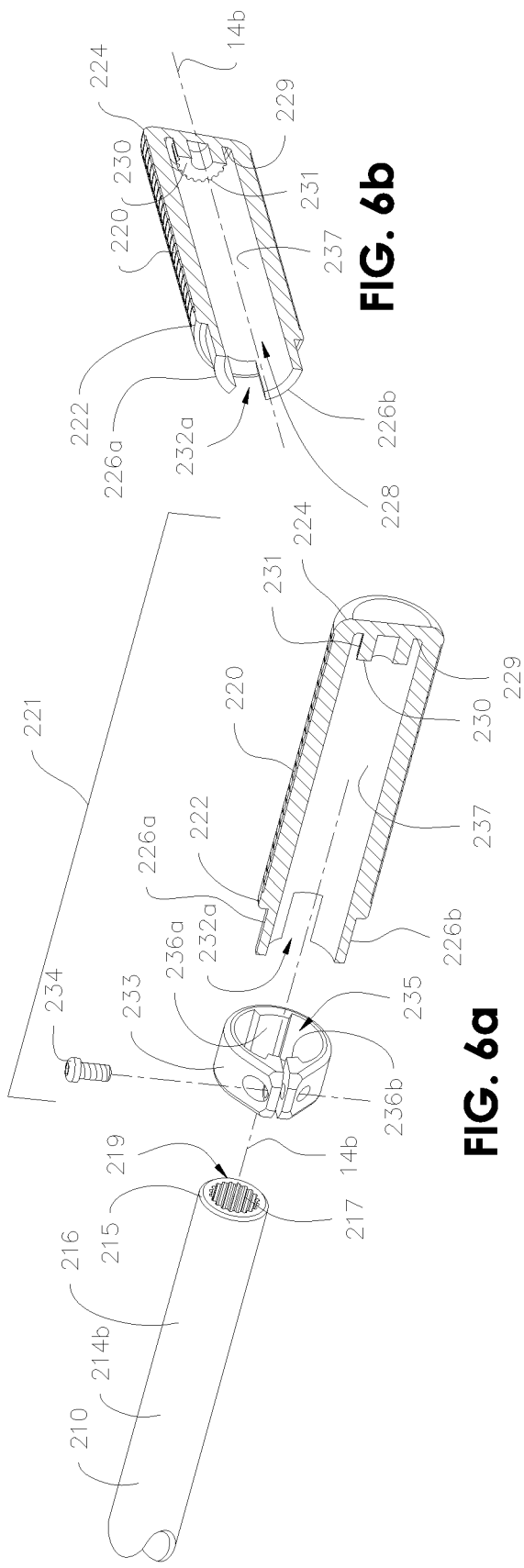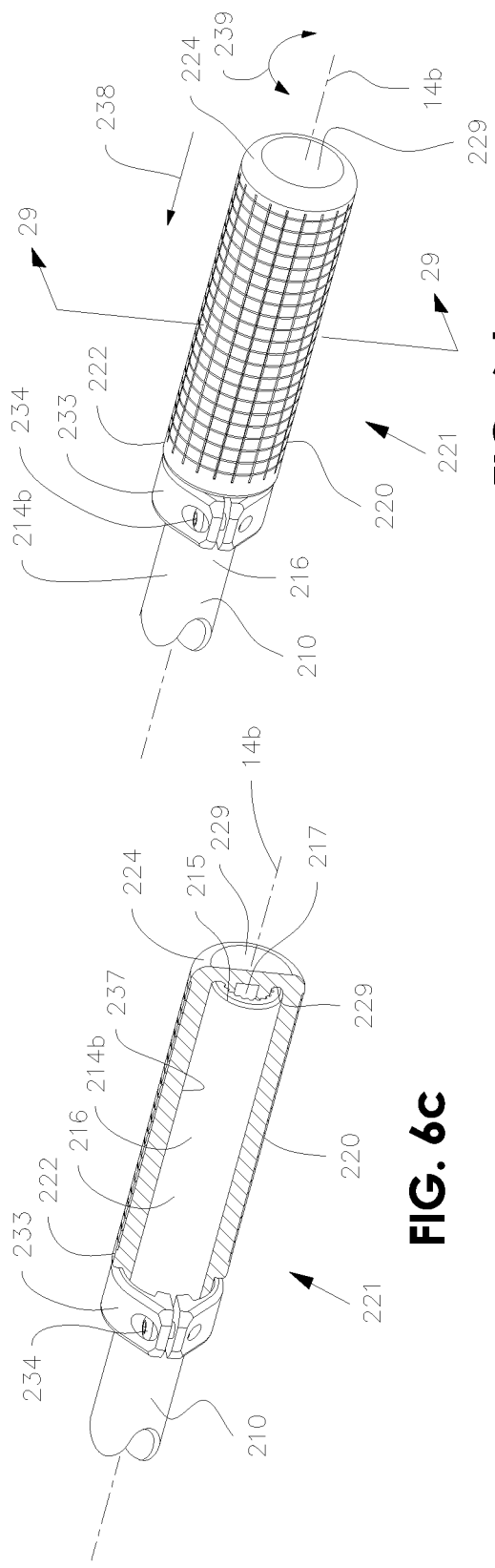

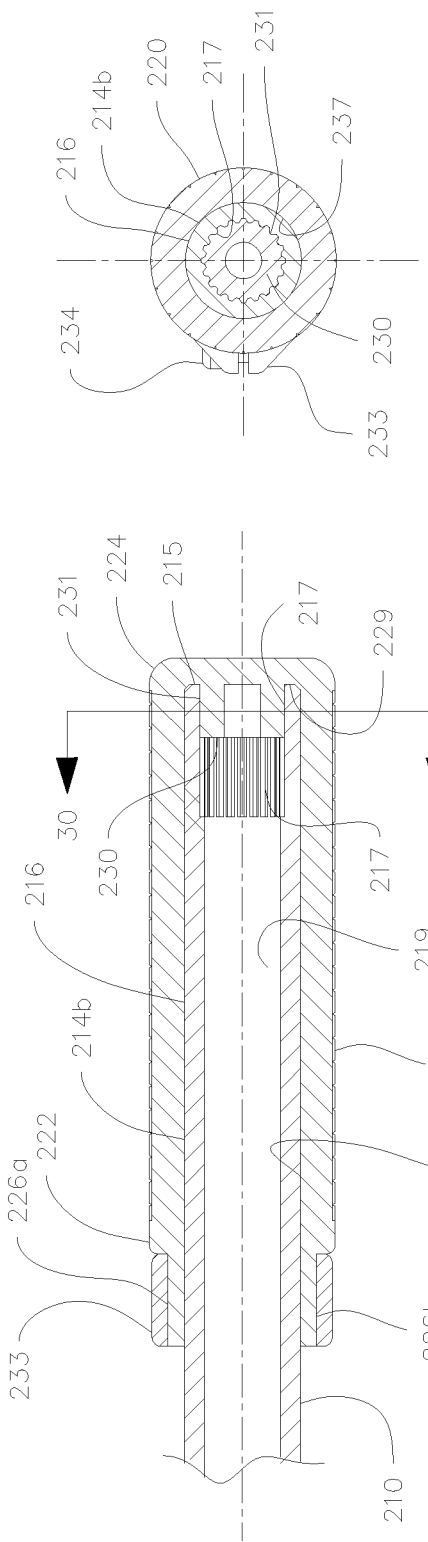
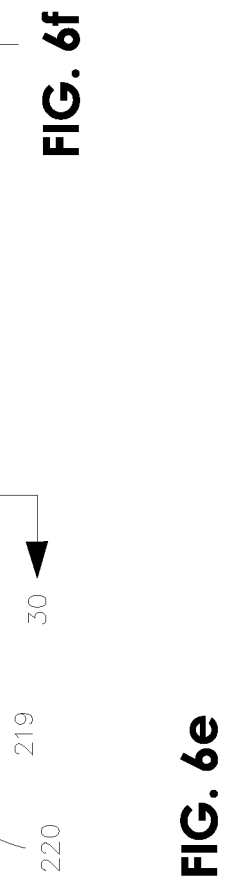
FIG. 6f
FIG. 6e

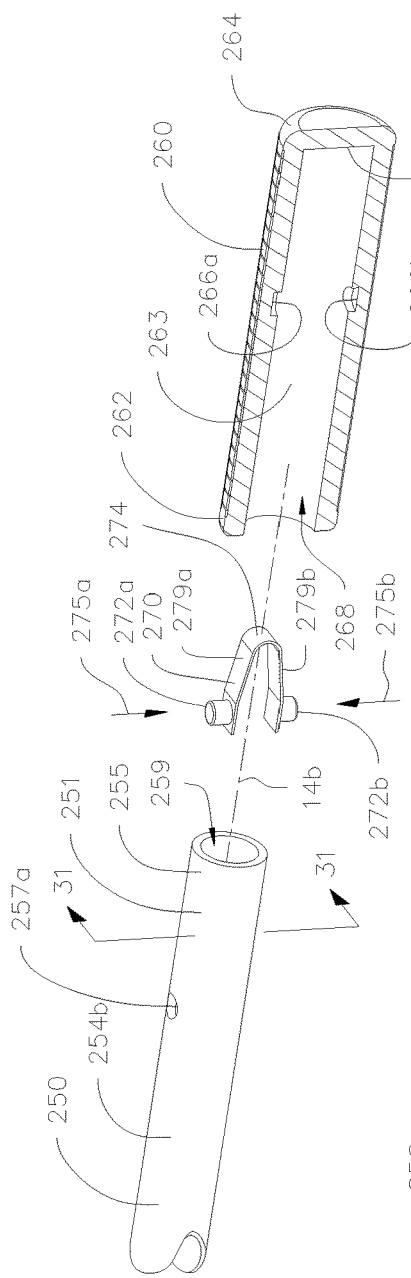
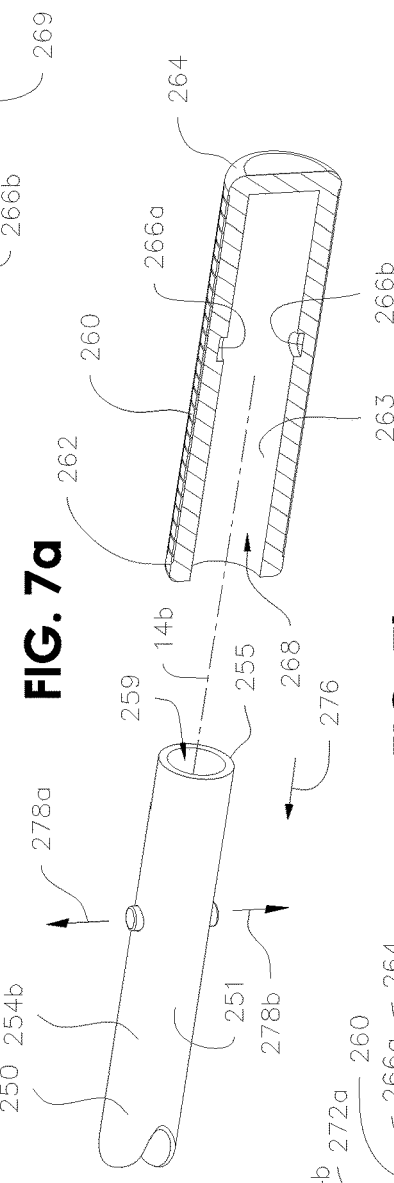
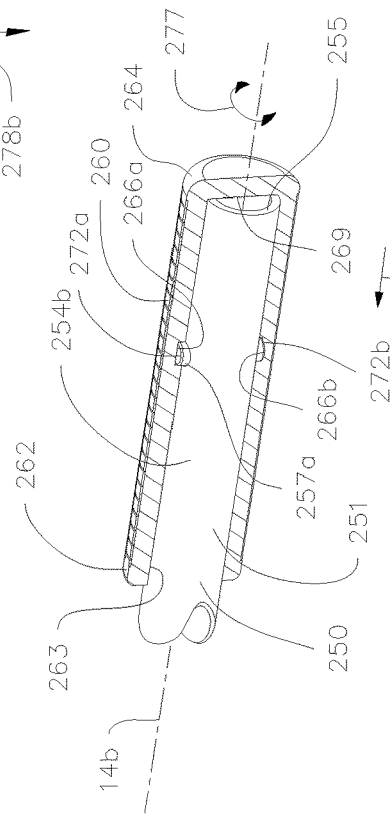
FIG. 7a
FIG. 7b
FIG. 7c

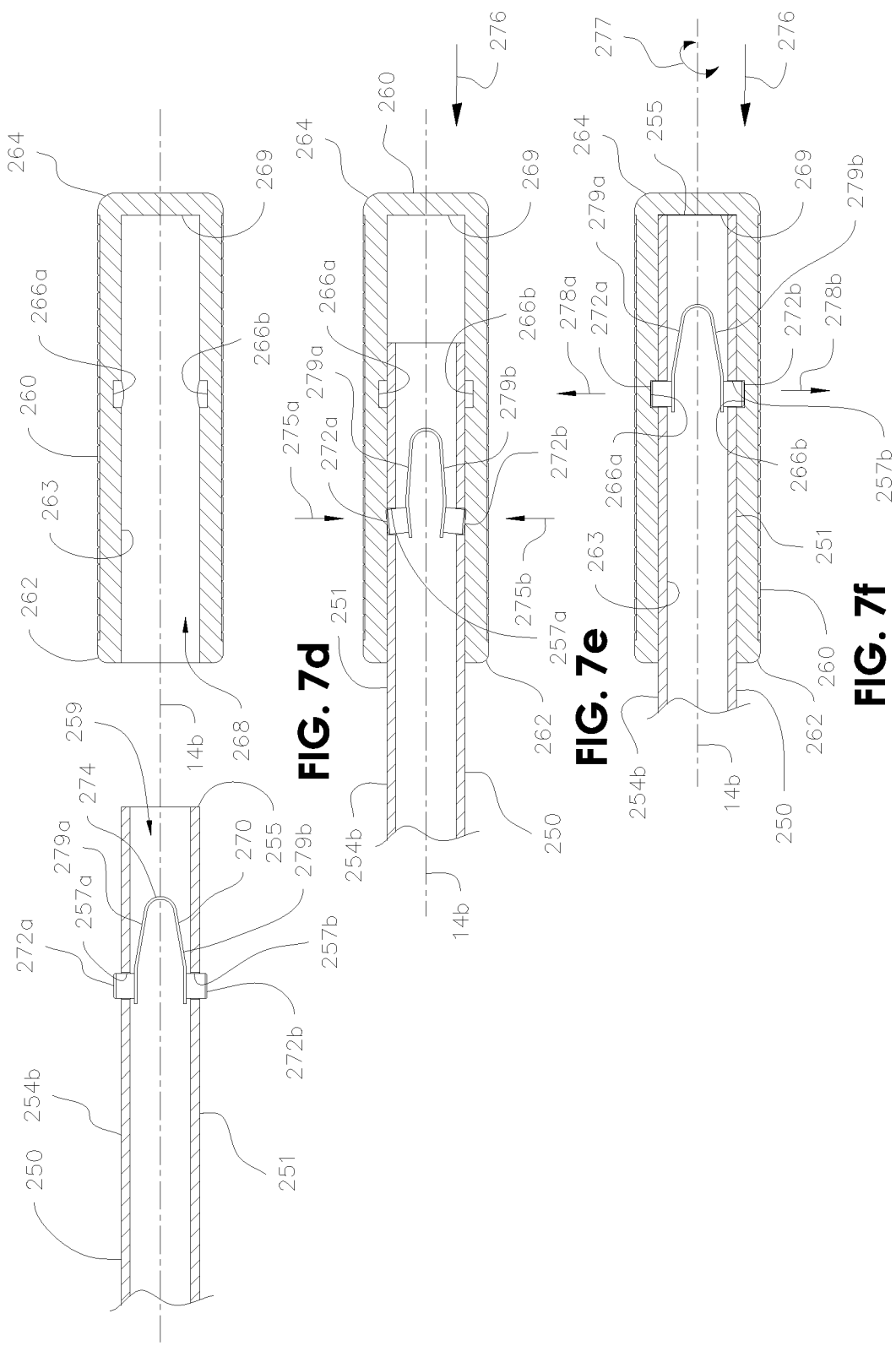

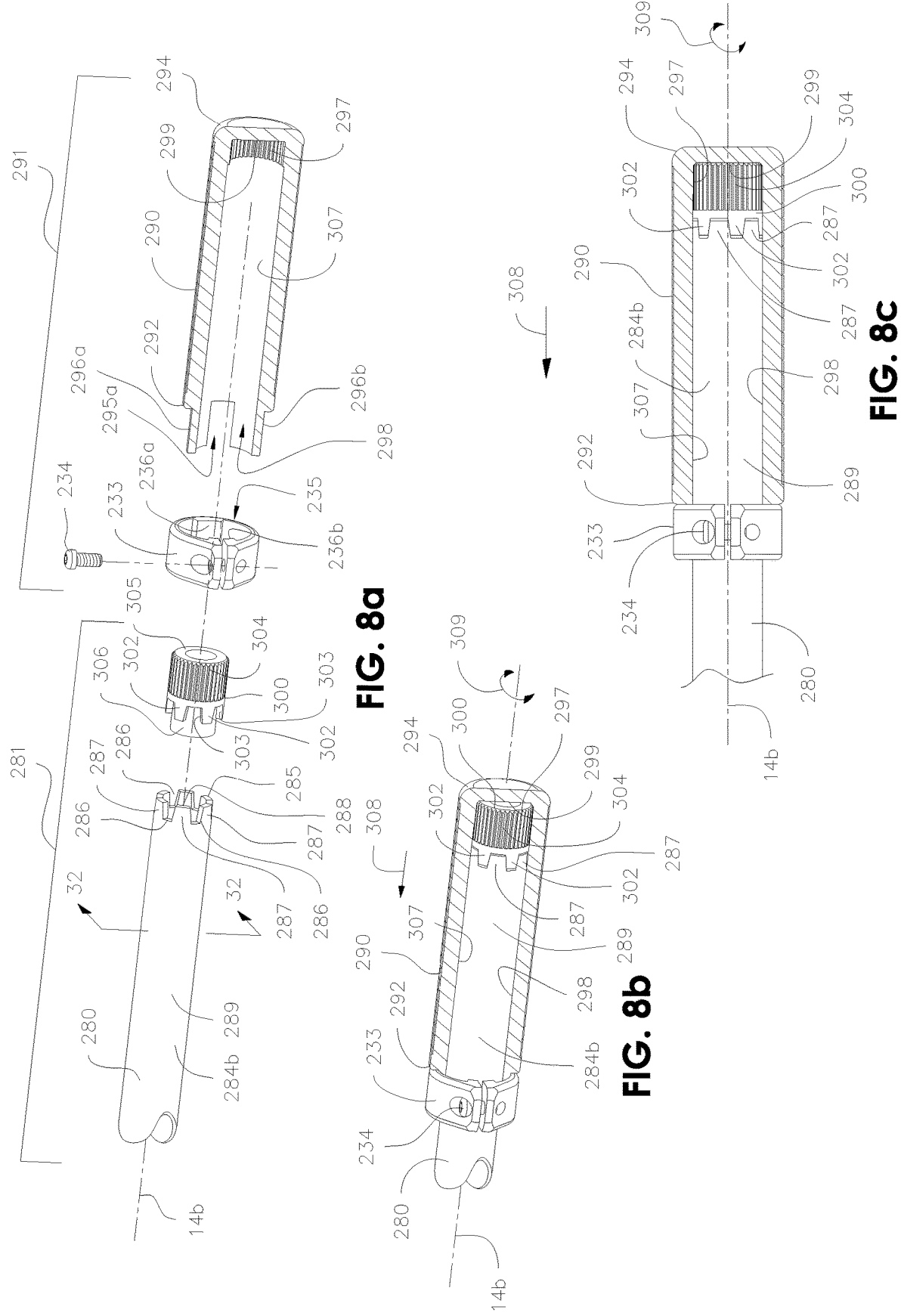

HANDLEBAR AND GRIP APPARATUS AND SYSTEM

CROSS-REFERENCES

This patent application claims the benefit of PCT application no. PCT/US2015/029524, by applicant PADLOC, LLC, and inventors Jason Moeschler, Chris Feucht, Evan Smith, Mark Slate, Patrick Seidler, and Raphael Schlanger, entitled "HANDLEBAR AND GRIP APPARATUS AND SYSTEM," filed on May 6, 2015, and which PCT application is fully incorporated by reference herein. This patent application also claims the benefit of provisional patent application No. 61/996,920, by Jason Moeschler, Chris Feucht, Evan Smith, Mark Slate, Patrick Seidler, and Raphael Schlanger, entitled "HANDLEBAR GRIP," filed on May 19, 2014, and which provisional application is fully incorporated by reference herein.

TECHNICAL FIELD

The present invention relates to a handlebar and grip apparatus and system, and more specifically to a handlebar and grip apparatus and system that prevents the grip from rotating, and provides cushioning in key area of the hand.

BACKGROUND

Current handlebar and grip devices generally require a way to prevent the grip from rotating with respect to the handlebar. Many current systems use two clamps or collars on the grip to prevent the grip from rotating. However, the clamps or collars tend to be located where a rider would place his or her hands, causing discomfort to the hands, and may cause an inability to properly hold the grips. Many grips do not provide enough cushion for the ulnar nerve in the hand, and thus can lead to injuries to the hand, such as, but not limited to ulnar neuropathy or handlebar palsy. Some grips provide for a wing shaped design, to provide for better cushioning near the ulnar nerve, but those wing shaped designs have disadvantages. Wing shaped grips can lead to twisting of the grips with respect to the handlebar. It is difficult for a rider to completely grip the wing shaped grip, thus limiting the user's ability to safely control the vehicle. In addition, the wing shaped grips often require clamps or collars, that can be in the way of the rider's hand. Traditional slide-on grips can twist and pull off handlebar.

FIGS. 1a-c describe a conventional prior art handlebar assembly 1, with left grip 4 and right grip 40 secured to the handlebar 8 by means of split collars 10a and 10b and split collars 50a and 50b respectively. FIG. 1a describes the basic configuration of an exemplary handlebar assembly 1, as well as a description of the direction conventions used throughout this disclosure. Handlebar 8 includes a left handle 6a with external sidewall 9a (not shown) and end face 13a (not shown), a right handle 6b with external sidewall 9b (not shown) and end face 13b (not shown), and a center portion 7 for assembly with a central clamping device (not shown) such as a handlebar stem or a triple clamp tree in the conventional manner. The disclosed apparatus and system can be used for bicycles (which may use a central clamping device), motorcycles (which may use a triple clamp tree), and other vehicles. Left grip 4 is assembled to the left handle 6a of the handlebar 8 in the conventional manner, with a split collar 10a securing the outboard end 12 of left grip 4 to the left handle 6a and with a split collar 10b securing the inboard end 11 of left grip 4 to the left handle 6a.

The axial axis 14a extends along the length of the left handle 6a and the axial axis 14b extends along the length of the right handle 6b. The axial direction 17 is a direction parallel to the axial axis 14b. The radial direction 18 is a direction generally perpendicular to the axial direction 17 and extending from the axial axis 14b radially outwardly. The tangential direction 19 is a direction perpendicular to both the radial direction 18 and axial direction 17, defining a generally tangent vector at a given radius from the axial axis 14b. The circumferential direction 20 is a cylindrical vector that wraps around the axial axis 14b at a given radius. A radial plane 22 is a plane perpendicular to the axial axis 14b that extends in a generally radial direction 18 at a given axial intercept. An axial plane 21 is a plane that is generally parallel to the axial axis 14b. Identical direction conventions are similarly based on axial axis 14a of the left handle 6a. The "down" direction 23 is a direction generally toward the ground and generally away from the palm of the operator. The "up" direction 24 is a direction generally toward the palm of the operator and generally opposed and distal from the ground.

In the ensuing descriptions, the term "axial" refers to a direction parallel to the centerline of the axial axis and the term "radial" refers to a direction perpendicular to the axial axis. An axially inboard (or inward) orientation is an orientation that is axially proximal to the center portion 7. Conversely, an axially outboard (or outward) orientation is an orientation that is axially distal from the center portion 7. A radially inboard (or inward) orientation is an orientation that is radially proximal to the axial axis 14a and/or 14b and a radially outboard (or outward) orientation is an orientation that is radially distal to the axial axis 14a and/or 14b. An axially inboard (or inward) facing surface is a surface that faces generally proximally toward the center portion 7. Conversely, an axially outboard (or outward) facing surface is a surface that faces generally distally away from the center portion 7.

FIG. 1b shows the right grip assembly 41 prior to its assembly or installation with right handle 6b. The right grip assembly 41 includes the right grip 40 and split collars 50a and 50b. Right grip 40 includes inboard end 42 with collar portion 46a extending axially inwardly therefrom, and outboard end 44 with collar portion 46b extending axially outwardly therefrom, and an axially extending opening 48 with interior sidewall 45 therethrough. Split collars 50a and 50b each include axial openings 52a and 52b and clamp screws 51a and 51b respectively. Split collars 50a and 50b are of a generally conventional configuration corresponding to a mechanical component also commonly referred to as a "clamp collar". Split collars 50a and 50b are first pre-assembled to the right grip 40, with collar portions 46a and 46b extending through openings 52a and 52b respectively.

Next, the right grip assembly 41 is sleevably assembled to the right handle 6b in direction 54 as shown in FIG. 1c, with the right handle 6b extending through opening 48. Finally, the clamp screws 51a and 51b are threadably tightened to reduce the diameter of openings 52a and 52b respectively to grip the right handle 6b and to axially retain and/or secure the right grip 40 to the right handle 6b. The split collars 50a and 50b attempt to circumferentially secure the right grip 40 to the right handle 6b and to restrict independent rotation therebetween, but often may rotate under hand twisting pressure. It is understood that the left grip 4 may be assembled to the left handle 6a, as shown in FIG. 1a, in a similar manner to the assembly of the right grip 40 to the right handle 6b as described hereinabove.

The right handle 6b is shown to have a generally circular cylindrical external contour about axial axis 14b and the opening 48 is also shown to have a generally circular cylindrical internal contour about axial axis 14b. As such, in the absence of split collars 50a and 50b, the opening 48 of right grip 40 would be easily circumferentially rotatable and axially slideable relative to the right handle 6b. The only restriction to such relative movement would be any friction that would exist between the internal surface of opening 48 and external surface of right handle 6b. The split collar 50a serves to provide an actively gripped connection between the inboard end 42 and the right handle 6b. Similarly, The split collar 50b serves to provide an actively gripped connection between the outboard end 44 and the right handle 6b.

Traditional slip on grips that primarily rely on friction, which do not use collars or clamps to keep the grip in place often rotate due to force. Rain, snow, water, and other liquids can cause the prior art grips to rotate. Prior art grips with one inboard collar also tend to rotate under heavy use, when the retaining collars are tightened to recommended torque. Over-tightening the retaining collars to resist twisting can damage or break the handlebar, potentially resulting in serious injury.

Split collars 50a and 50b may serve to axially and circumferentially engage collar portions 46a and 46b respectively while also contacting and gripping the external surface of the right handle 64b. Alternatively, split collars 50a and 50b may serve to contact the collar portions 46a and 46b respectively while pressing collar portions 46a and 46b radially inwardly to press and grip the external surface of the right handle 64b. In both cases, the split collars 50a and 50b serve to axially and/or circumferentially bind the right grip 70 to the right handle 64b. Such functionality of split collars is inferred throughout this disclosure. The collar 50b is often located where a rider may want to grip the grip or handlebar, causing discomfort or injury to the rider.

Thus there is a need for a handlebar and grip apparatus and system that overcomes the above listed and other disadvantages.

SUMMARY OF THE INVENTION

The disclosed invention relates to a handlebar and grip system comprising: a handlebar, the handlebar comprising: a center portion; a right handle attached to a first end of the center portion, the right handle comprising: a right handle outboard end; a right handle engaging geometry located on the right handle outboard end a left handle attached to the second end of the center portion, the left handle comprising: a left handle outboard end; a left handle engaging geometry located on the left handle outboard end; a right grip configured to slide onto the outboard end of the right handle, the right grip comprising: a right grip central opening; a right grip engaging geometry located in the right grip central opening; a left grip configured to slide onto the outboard end of the left handle; a left grip central opening; a left grip engaging geometry located in the left grip central opening; where the right grip engaging geometry is configured to engage with the right handle engaging geometry such that the right grip will generally be prevented from rotating about the right handle when the right grip has been slid onto the right handle; and where the left grip engaging geometry is configured to engage with the left handle engaging geometry such that the left grip will generally be prevented from rotating about the left handle when the left grip has been slid onto the left handle.

The invention also relates to a handlebar comprising: a center portion; a right handle attached to a first end of the center portion, the right handle comprising: a right handle outboard end; a right handle engaging geometry located on the right handle outboard end; a left handle attached to the second end of the center portion, the left handle comprising: a left handle outboard end; a left handle engaging geometry located on the left handle outboard end.

In addition the invention relates to a grip comprising: a grip central opening; a grip engaging geometry located in the grip central opening.

BRIEF DESCRIPTION OF THE DRAWINGS

The present disclosure will be better understood by those skilled in the pertinent art by referencing the accompanying drawings, where like elements are numbered alike in the several figures, in which:

FIG. 3a is an exploded perspective view of a second embodiment of the present invention, showing the handlebar with the left grip assembled thereto and with the right grip prior to its assembly with the right handle of the handlebar, including a notch cut in the right handle and with the right grip including a bump contour to provide a rotationally keyed engagement with the notch cut contour, and including a split collar;

FIG. 3b is a perspective view of the embodiment of FIG. 3a, showing the right grip as fully assembled to the right handle portion, with the split collar securing the inboard end of the right grip to the right handle and the second end of the right grip rotationally keyed to the notch cut;

FIG. 4a is a partial exploded perspective view of a third embodiment of the present invention, with the right grip prior to its assembly with the right handle of the handlebar, including multiple notches in the right handle, and with the right grip including keying geometry to provide a rotationally keyed engagement with the multiple notches, and including a split collar;

FIG. 4b is a partial perspective view of the embodiment of FIG. 4a, showing the right grip as fully assembled to the right handle portion, with the split collar securing the inboard end of the right grip to the right handle and the keying geometry of the right grip rotationally keyed to the multiple notches;

FIG. 4c is a partial cross section view of the embodiment of FIG. 4a, taken along 27-27, and corresponding to the assembly sequence and view of FIG. 4b, showing the keys of the right grip nested and engaged with the multiple notches of the right handle;

FIG. 4d is a cross section view of the embodiment of FIG. 4a, taken along 28-28, and corresponding to the assembly sequence and view of FIG. 4b, showing the keys of the right grip nested and engaged with the multiple notches of the right handle;

FIG. 5a is a partial exploded perspective view of a fourth embodiment of the present invention, with the right grip shown in cross section along 33-33, with the right grip prior to its assembly with the right handle of the handlebar, including external splines in the right handle and with the right grip including internal splines to provide a rotationally keyed engagement with the external splines, and including a locking screw;

FIG. 5b is a partial perspective view of the embodiment of FIG. 5a, with the right grip shown in cross section along 33-33, and showing the right grip as fully assembled to the right handle, and with the locking screw axially securing the right grip to the right handle;

FIG. 5c is a partial perspective view of the embodiment of FIG. 5a, showing the right grip as fully assembled to the right handle portion, with the locking screw axially securing the right grip to the handle portion;

FIG. 6a is a partial exploded perspective view of a fifth embodiment of the present invention, with the right grip shown in cross section along 29-29, showing the right grip prior to its assembly with the right handle, including internal splines in the right handle and with the right grip including external splines to provide a rotationally keyed engagement with the internal splines, and including a split collar;

FIG. 6b is a partial perspective cross section view of the right grip of the embodiment of FIG. 6a, taken along 29-29, showing the external splines at the outboard end of the right grip;

FIG. 6c is a partial perspective view of the embodiment of FIG. 6a, showing the right grip as fully assembled to the right handle with the right grip in cross section along 29-29, with the split collar securing the inboard end of the right grip to the right handle and the external splines of the right grip rotationally keyed to the internal splines;

FIG. 6d is a perspective view of the embodiment of FIG. 6 corresponding to the assembly sequence of FIG. 6c;

FIG. 6e is a partial orthogonal cross section view taken along 29-29, and corresponding to the assembly sequence of FIG. 6c;

FIG. 6f is a cross section view taken along 30-30, and corresponding to the assembly sequence of FIG. 6c, showing the external splines of the right grip nested and engaged with the internal splines of the right handle;

FIG. 7a is a partial exploded perspective view of a sixth embodiment of the present invention, with the right grip shown in cross section, with the right grip prior to its assembly with the right handle of the handlebar, including cross drilled holes in the right handle, and including a spring clip, and with the right grip including internal recesses;

FIG. 7b is a partial perspective view of the embodiment of FIG. 7a, with the right grip in cross section along 31-31, showing the spring clip as pre-assembled to the right handle, and with the right grip shown prior to its assembly with the right handle.

FIG. 7c is a partial perspective view of the embodiment of FIG. 7a, showing the right grip in cross section and as fully assembled to the right handle portion, with the engagement pins of the spring clip circumferentially and axially keyed to both the right handle and the right grip.

FIG. 7d is a partial orthogonal cross section view taken along 31-31, and corresponding to the assembly sequence and view of FIG. 7b;

FIG. 7e is an orthogonal cross section view of the embodiment of FIG. 7a, taken along 31-31, and corresponding to the transition between the assembly sequences of FIG. 7b and FIG. 7c, with the right grip partially assembled to the right handle;

FIG. 7f is an orthogonal cross section view of the embodiment of FIG. 7a, taken along 31-31, and corresponding to the assembly sequence of FIG. 7c;

FIG. 8a is a partial exploded perspective view of a seventh embodiment of the present invention, with the right grip in cross section along 32-32, with the right grip prior to its assembly with the right handle of the handlebar, including an intermediate keying element and a split collar;

FIG. 8b is a partial perspective view of the embodiment of FIG. 8a, showing the right grip in cross section along 32-32, with the right grip fully assembled to the right handle, and with the split collar securing the inboard end of the right grip to the right handle, and with the intermediate keying element rotationally keyed to the right handle by means of notches and to the right grip by means of external splines.

FIG. 8c is an orthogonal partial section view of the embodiment of FIG. 8a, with the right grip in cross section along 32-32, of the embodiment FIG. 8a, corresponding to the view of FIG. 8b, with the right grip fully assembled to the right handle portion.

DETAILED DESCRIPTION OF THE INVENTION

Figure 1A:
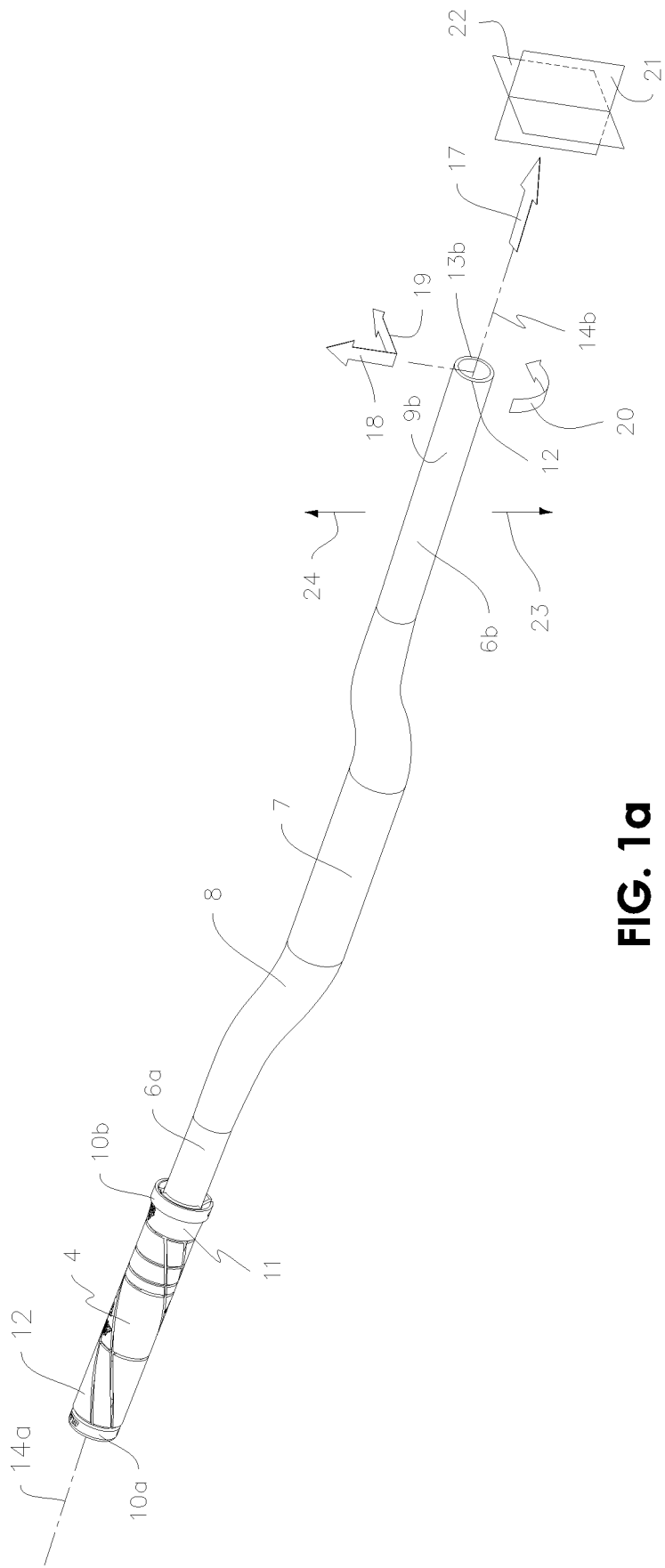
FIG. 1a is a perspective view schematically illustrating the general configuration of a prior art handlebar, with left grip assembled thereto.

FIGS. 2a-e describe an embodiment of the present invention where the outboard end 65 of the right handle 64b is manufactured to an angle 67 to the axial axis 14b to create a wedge geometry 73 with a generally planar wedge surface 66 to provide a rotationally keyed engagement and an axial depth stop with the right grip 70 about the axial axis 14b. Handlebar 60 includes a left handle 64a, a right handle 64b, and a center portion 61 for assembly with a central clamping device (not shown) in the conventional manner. The right handle 64b is a tubular element with an external sidewall 59, and end face 58, and a central opening 63 extending therein. The external sidewall 59 also includes an upper surface 68 that generally faces the operator's palm (not shown) and a lower surface 69 opposed to the upper surface and generally facing the ground (not shown). The wedge surface 66 is shown here to be generally aligned along angle 67 such that the lower surface 69 extends axially outwardly relative to the upper surface. In other embodiments, the wedge surface 66 may be oriented, for instance, the wedge surface, may face down, or may face towards the rear of the bicycle, or may face towards the front of the bicycle, or may be at any angle about the axial axis 14b. The end face 58 includes wedge surface 66, and the portion of the wedge surface 66 that is adjacent to the lower surface 69 projects axially outwardly relative to the portion of the wedge surface 66 that is adjacent to the upper surface 68.

Figure 1B:
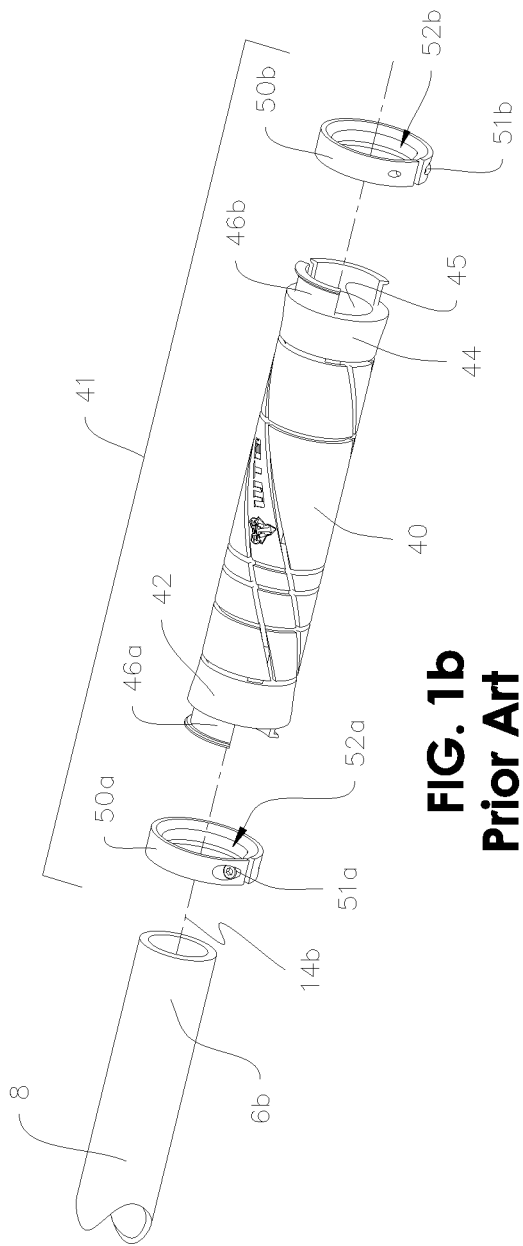
FIG. 1b is an exploded perspective view handlebar of FIG. 1a, illustrating a right handlebar grip prior to its installation onto the right handle portion of the handlebar, including split collars.
Figure 1C:
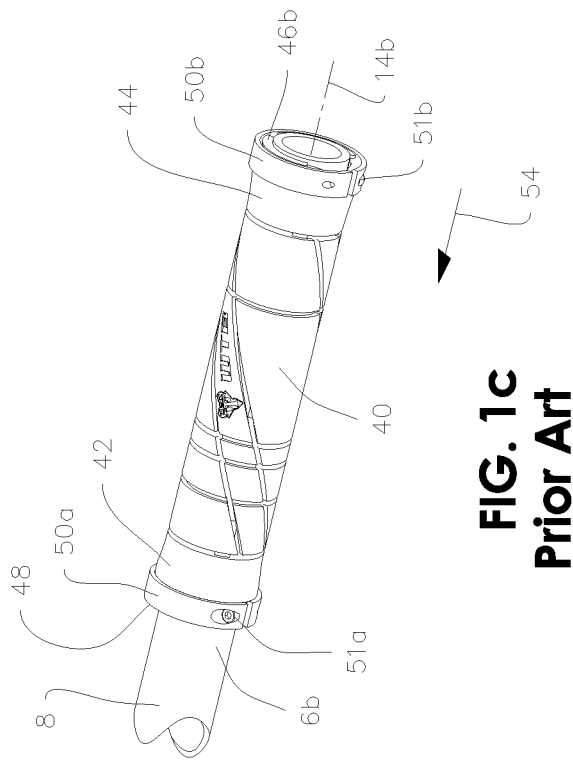
FIG. 1c is a perspective view handlebar of FIG. 1a, illustrating the right handlebar grip as installed onto the right handle portion of the handlebar and secured thereto by the split collars.
Figures 2A, 2B:
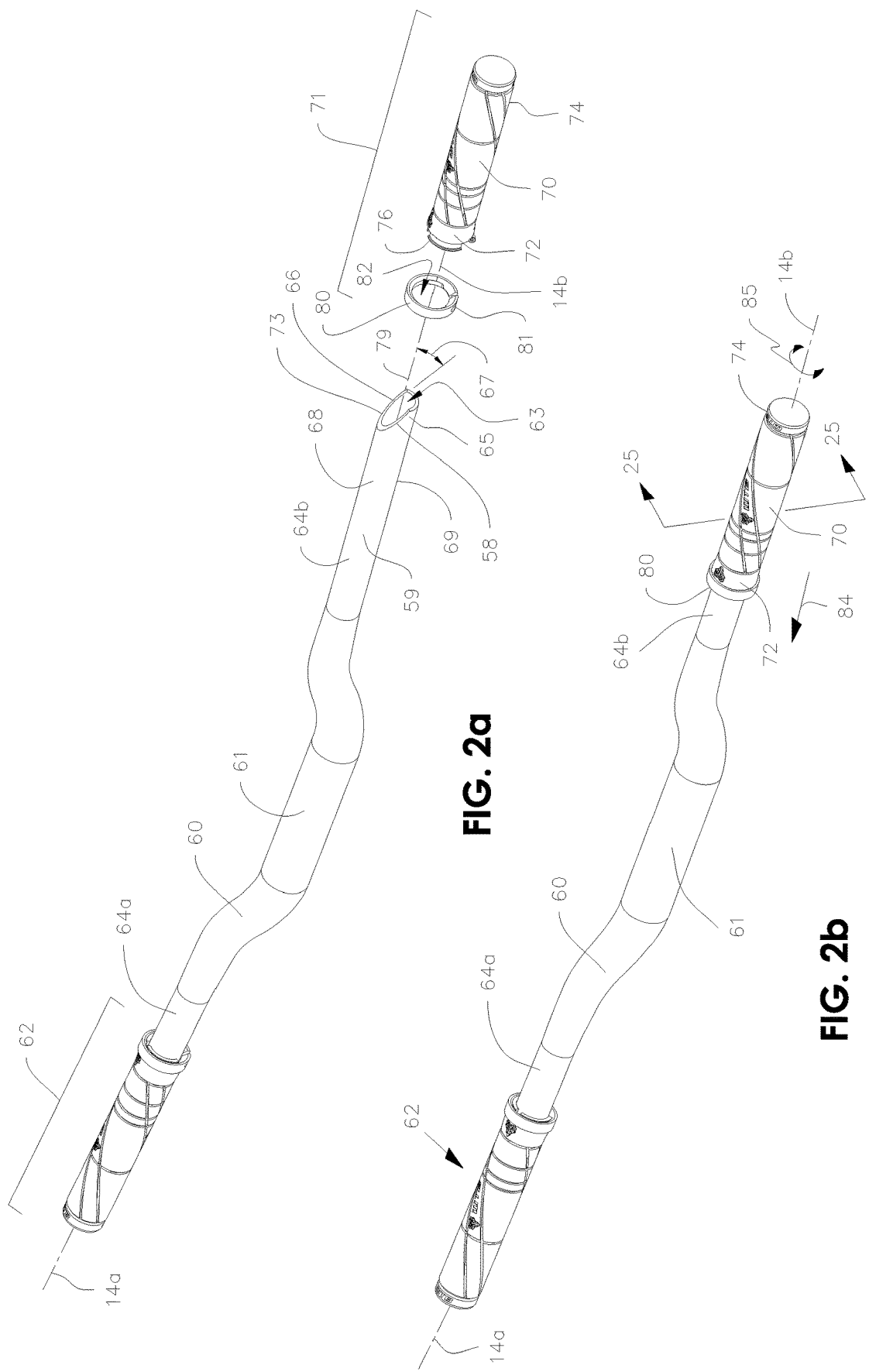
FIG. 2a is an exploded perspective view of a first embodiment of the present invention, showing the handlebar with the left grip assembled thereto and with the right grip prior to its assembly with the right handle of the handlebar, including a wedge surface in the right handle and with the right grip including wedge contour geometry to provide a rotationally keyed engagement with the wedge surface, and including a split collar.
FIG. 2b is a perspective view of the embodiment of FIG. 2a, showing the right grip as fully assembled to the right handle portion, with the split collar securing the first end of the right grip to the handle portion and the wedge contour of the right grip rotationally keyed to the wedge surface of the handlebar.
Figure 2C:
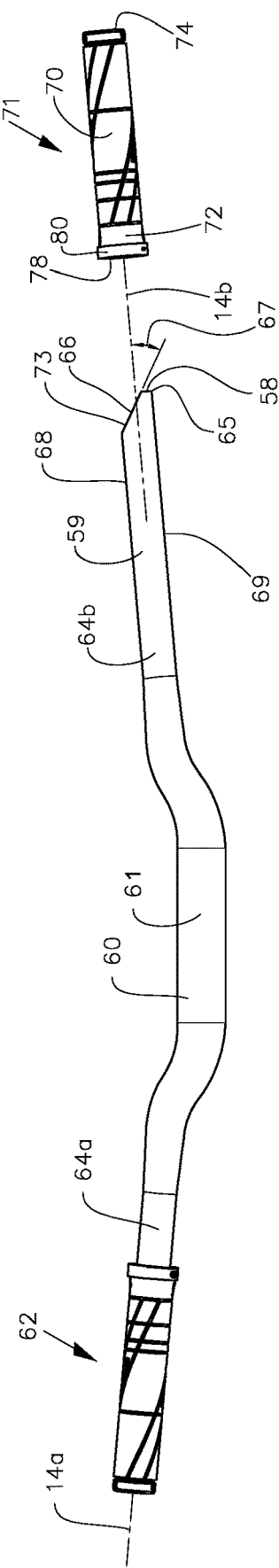
FIG. 2c is an orthogonal exploded view of the embodiment of FIG. 2a, showing the handlebar with the left grip assembled thereto and with the right grip assembly prior to its axial assembly with the right handle of the handlebar.

As shown in FIG. 2a, left grip assembly 62 has already been assembled to the left handle 64a of the handlebar 60 in a manner generally identical to the assembly between the right grip assembly 71 and right handle 64b as outlined in the ensuing description. FIG. 2a shows the right grip assembly 71 prior to its assembly and installation with right handle 64b. The right grip assembly 71 includes the right grip 70 and split collar 80. Right grip 70 includes inboard end 72 with collar portion 76 extending axially inwardly therefrom, outboard end 74, and an axially extending opening 78 (shown in FIG. 2c). Opening 78 is a blind opening extending along the axial axis 14b, with an entrance adjacent the inboard end 72, an internal sidewall 94, and an end face 79 adjacent the outboard end 74. Further, end face 79 includes an internal wedge contour 77 (shown in FIG. 2d) to provide a geometry that is matched to the wedge surface 66 upon assembly with the right handle 64b. Split collar 80 includes axial opening 82 and clamp screw 81 and functions in a manner similar to split collars 50a and 50b of FIGS. 1a-c. Split collar 80 is first pre-assembled to the right grip 70, with collar portion 76 extending through opening 82 to create grip assembly 71, as shown in FIG. 2c.

The wedge cut 73 and corresponding wedge surface 66 may be considered as a non-circular portion of the right handle 64b that is relieved to be radially inboard of the external sidewall 59 and axially inboard of the outboard end 65. Similarly, the wedge contour 77 may be considered as a non-circular portion of the grip 70 that is projecting radially inwardly from the internal sidewall 94 and axially inwardly from the end face 79.

Next, the right grip assembly 71 is sleevably assembled to the right handle 64b in direction 84 as shown in FIG. 2b, with the right handle 64b extending within opening 78. As it is advanced in direction 84, the right grip assembly 71 is twisted as required such that the wedge surface 66 is circumferentially aligned with the wedge contour 77. With the right grip 70 fully advanced in direction 84, the wedge surface 66 abuts, wedges, and is nested with the wedge contour 77. This abutting engagement serves as a wedging depth stop to restrict further displacement of the right grip 70 in the axially inward direction (i.e. direction 84) relative to the right handle 64b. As the right grip 70 is further pressed in direction 84, the wedge contour 77 may preferably wedge against wedge surface 66 along angle 67 to reduce any circumferential clearance between the outboard end 74 and the outboard end 65. This wedging engagement reduces or eliminates circumferential freeplay or twisting (about axial axis 14b) between the outboard end 74 and outboard end 65. The right grip 70 is thus rotationally keyed in direction 85 relative to the right handle 64b. Finally, the clamp screw 81 is threadably tightened to reduce the diameter of opening 82 to axially grip and/or secure inboard end 72 to the right handle 64b. Thereby, the rotationally keyed engagement between the wedge surface 66 and the wedge contour 77 is also maintained. The split collar 80 also serves to circumferentially grip and/or secure the inboard end 72 to the right handle 64b and to restrict independent rotation therebetween.

It is possible to rely on this wedging engagement to circumferentially key the outboard end 74 to the outboard end 65 and to restrict any undesirable circumferential twisting or rotation of the right grip 70 relative to the right handle 64b. However, the right grip 70 may not have sufficient torsional rigidity from preventing such twisting at the inboard end 72. For this reason it may be preferable to include an optional clamp collar 80, as shown in FIGS. 2a-d, as a means to prevent or to limit such twisting at the inboard end.

Figure 2D:
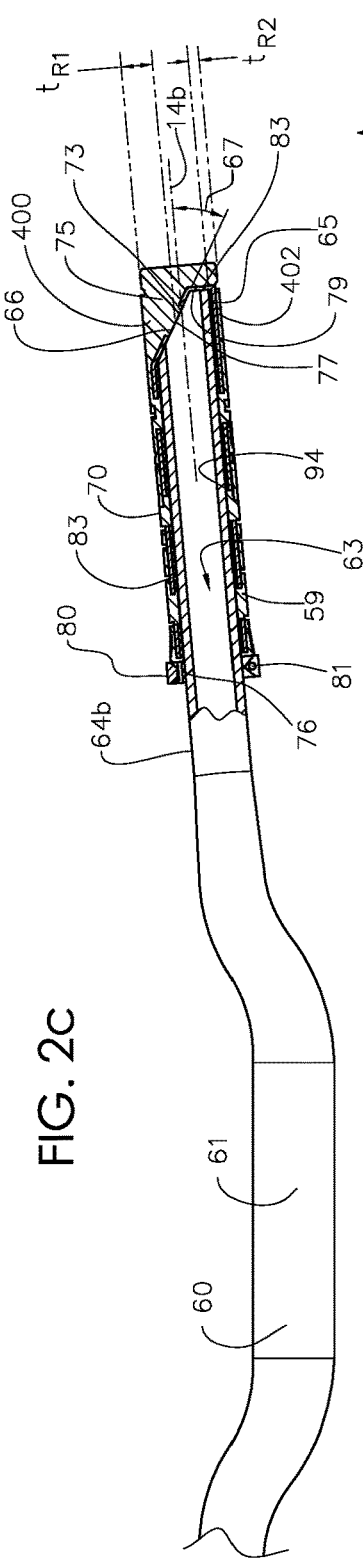
FIG. 2d is an orthogonal partial cross section view, taken along 25-25, of the embodiment FIG. 2b, showing the right grip assembly as fully assembled to the right handle portion, with the split collar securing the inboard end of the right grip to the right handle and the wedge contour of the right grip rotationally keyed to the wedge surface.

The right handle 64b is shown to have a generally cylindrical external sidewall 59 about axial axis 14b and the opening 78 is also shown to have a generally circular cylindrical internal contour about axial axis 14b. Such mating concentric contours would normally be easily circumferentially rotatable relative to each other. The only restriction to such relative movement would be any friction that would exist between the internal surface of opening 78 and external surface of right handle 64b. The wedge surface 66 geometry provides a noncircular feature in the outboard end 65. Similarly, the wedge contour 77 geometry provides a noncircular feature adjacent outboard end 74. These two noncircular features 66, 77 circumferentially engage each other to provide a rotationally keyed engagement between the right grip 70 and the right handle 64b. FIGS. 2c and 2d provide further detailed description of this embodiment. FIG. 2d particularly illustrates the nested contour engagement between the wedge surface 66 and the wedge contour 77.

In viewing FIG. 2d, it may be seen that grip 70 includes an internal skeleton 83 within the thickness of the grip 70 itself. For enhanced ergonomics and tactile feel for the benefit of the operator, it may be preferable that the external surface of the grip 70 (i.e. the surface that is exposed to the operator's palm) be of a softer elastomer material. However such softer elastomer materials often do not have the desired rigidity or structure to adequately support the grip. Therefore, it may be preferable to over mold this softer elastomer material over an internal skeleton 83 that is commonly made of a harder and stiffer material to provide structure to the grip 70. This internal skeleton 83 is also shown to cover or partially bridge the entrance to opening 63 adjacent the wedge surface 66, which serves to support the softer elastomer material across the opening 63.

It is understood that the left grip 62 and right grip 70 are utilized to provide a comfortable surface for gripping by the hand of the operator. The operator's ulnar nerve generally runs adjacent the outside portion of their palm. Prolonged gripping of the operator's hand and the pressure of their palm against the grip (62 and/or 70), along with vibration and shock from the terrain and/or road, may impinge the ulnar nerve and cause hand numbness and/or damage to the ulnar nerve. An advantage of this handlebar and grip apparatus and system may be to reduce this pressure and/or vibration on the palm in the ulnar region and to reduce road vibration transmitted to the operator's hand in an effort to reduce or eliminate this numbness and/or damage to the ulnar nerve. As shown in FIG. 2d, the wedge contour 77 also creates a thickened region 75 of the right grip 70 adjacent the outboard end 74. This thickened region 75 also faces upwardly 86 toward the palm of the operator, generally in the region adjacent the ulnar nerve. Since the right grip 70 may be generally molded from soft and resilient elastomeric material, the thickened region 75, and its corresponding extra radial thickness of soft material, may serve to provide the benefit of additional cushioning and vibration damping to the operator's palm, especially in its sensitive ulnar region. This serves to reduce or eliminate the propensity for damage to the ulnar nerve. Also shown are a first portion 400 with radial thickness $t_{R1}$ and a second portion 402 with a radial thickness $t_{R2}$. The first portion 400 has a greater radial thickness $t_{R1}$ than the radial thickness $t_{R2}$ of the second portion 402.

Figure 2E:
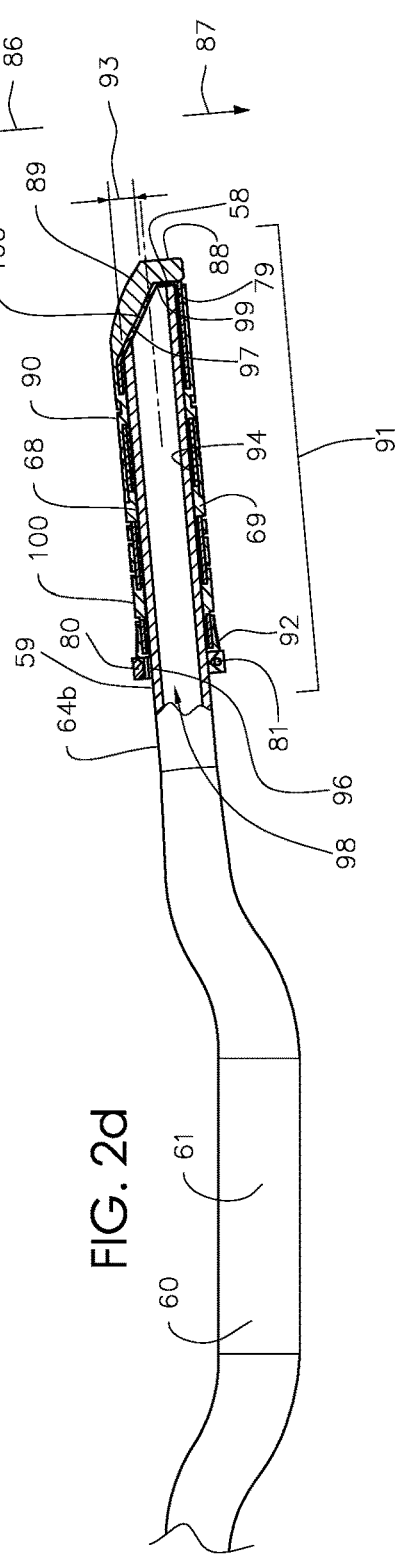
FIG. 2e is an orthogonal partial section view of an alternate embodiment to that of FIG. 2a, and corresponding to the assembly sequence and view of FIG. 2d, showing an alternate right grip with a relieved external contour.

FIG. 2e describes an alternate embodiment similar to the embodiment of FIGS. 2a-d. Handlebar 60 and split collar 80 are generally the same to those described in FIGS. 2a-d. The right grip assembly 91 is similar to right grip assembly 71 and includes the right grip 90 and split collar 80. Right grip 90 includes inboard end 92 with collar portion 96 extending axially inwardly therefrom, and an axially extending opening 98 therethrough. Opening 98 is a blind opening that has an internal sidewall 94 and an end face 99 adjacent the outboard end 88. Further, opening 98 includes an internal wedge contour 97 to provide geometry that is matched to the wedge surface 66 upon assembly with the right handle 64b. In contrast to the grip 70 of FIGS. 2a-d, grip 90 includes a radially relieved contour 89 adjacent its outboard end 88 that extends axially outwardly to the outboard end 88 of the right grip 90. The relieved contour 89 faces generally upwardly 86 and tapers radially inwardly toward the axially outward direction such that it preferably intersects the outboard end 88 at a location radially inboard from the upper surface 68 of the right handle 64b by radial offset 93. The grip 90 also includes an internal skeleton 100 that is similar to skeleton 83 as described in FIG. 2d.

The relieved contour 89 preferably results in a flattened region of lesser curvature than the circumferential periphery of the right grip 90. This flatter region results in a broader and flatter area to reduce pressure on the operator's palm and to provide the benefit of reduced contact pressure on the operator's palm, especially in the sensitive ulnar region. Further, since the relieved contour 89 tapers radially inwardly as described hereinabove, this may also serve to reduce pressure on the operator's palm in the ulnar region by relieving the surface of the right grip 90 away from the palm to further reduce the contact pressure therebetween.

It is also noted that the lower surface 69 projects to a location axially outward from the relieved contour 89 such that the relieved contour 89 may be supported from below by the lower surface 69 of the right handle 64b to resist downward 87 loading by the palm of the operator. This axially outward extension of the lower surface 69 lends structure to the soft material of the right grip 90 to prevent the outboard end 88 from collapsing or flexing excessively.

FIGS. 3a-d describe an another embodiment of the present invention. In this embodiment, the end face 115 of the right handle 114b includes a notch cut 116 to provide a rotationally keyed engagement with the right grip 120 about the axial axis 14b. Handlebar 110 includes a left handle 114a, a right handle 114b, and a center portion 111 for assembly with a central clamping device (not shown) in the conventional manner. The right handle 114b also includes an external sidewall 109 with an upper surface 118 and a lower surface 119 opposed to the upper surface 118 and an axially outboard end face 115.

Figure 3C:
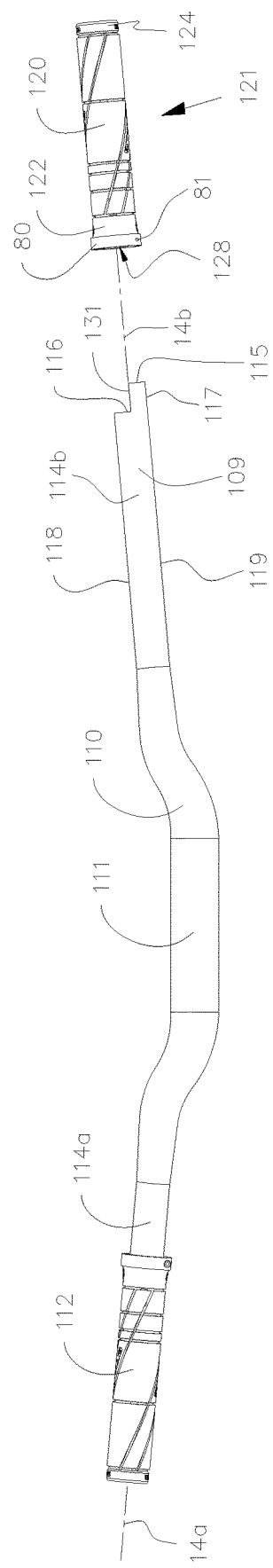
FIG. 3c is an orthogonal exploded view of the embodiment of FIG. 3a, showing the handlebar with the left grip assembled thereto and with the right grip assembly prior to its axial assembly with the right handle of the handlebar.
Figure 3D:
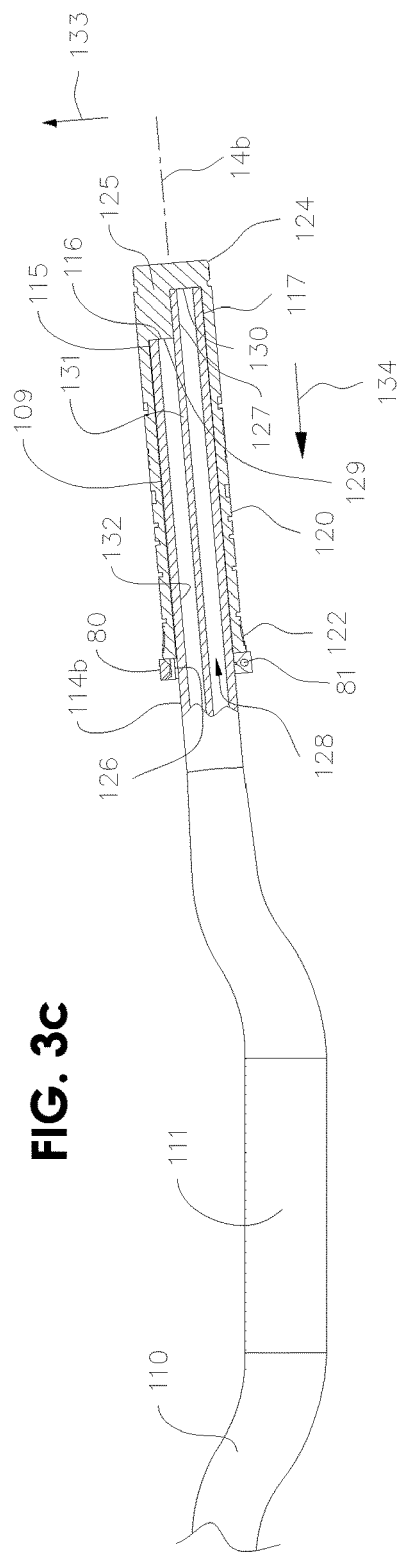
FIG. 3d is an orthogonal partial cross section view, taken along 26-26, of the embodiment FIG. 3a, showing the right grip assembly as fully assembled to the right handle, with the split collar securing the inboard end of the right grip to the right handle and the bump contour rotationally keyed to the notch cut.

As shown in FIG. 3a, left grip assembly 112 has already been assembled to the left handle 114a of the handlebar 110 in a manner identical to the assembly between the right grip assembly 121 and right handle 114b as outlined in the ensuing description. FIG. 3a shows the right grip assembly 121 prior to its assembly and installation with right handle 114b. The right grip assembly 121 includes the right grip 120 and split collar 80. Right grip 120 includes inboard end 122 with collar portion 126 extending axially inwardly therefrom, outboard end 124, and an axially extending opening 128 therethrough with an internal sidewall 132. Opening 128 is a blind opening extending along the axial axis 14b, with an entrance adjacent the inboard end 122, and an end face 129 adjacent the outboard end 124. Further, opening 128 includes an axially inwardly projecting internal bump contour 127 (shown in FIG. 3d) with a corresponding semicircular relief 130 to provide geometry that is axially overlapping and opposedly matched to the semicircular extension 117 upon assembly with the right handle 114b as shown in FIG. 3d. The split collar 80 may be generally identical to that described in FIGS. 2a-e and is first preassembled to the right grip 120, with collar portion 126 extending through opening 82 as shown in FIG. 3c.

Next, the right grip assembly 121 is sleevably assembled to the right handle 114b in direction 134 as shown in FIG. 3b, with the right handle 114b extending within opening 128. As it is advanced in direction 134, the right grip 120 is twisted as required such that the notch cut 116 is circumferentially opposedly aligned with the bump contour 127. With the right grip 120 fully advanced in direction 134, the notch cut 116 abuts and is nested with the bump contour 127. This abutting engagement serves as a depth stop to restrict further displacement of the right grip 120 in direction 134 relative to the right handle 114b. With the semicircular extension 117 now generally engaged with the semicircular relief 130, a rotationally keyed engagement between right grip 120 and the right handle 114b is achieved to reduce or limit circumferential freeplay or twisting in direction 135 between the outboard end 124 and end face 115. Finally, the clamp screw 81 is threadably tightened to reduce the diameter of opening 82 to grip the right handle 114b and to axially retain and/or secure the right grip 120 to the right handle 114b. The split collar 80 also serves to circumferentially secure the inboard end 122 to the right handle 114b and to restrict independent rotation therebetween.

The semicircular extension 117 and semicircular relief 130 both provide geometry that is noncircular about the axial axis 14b. These two noncircular geometries axially overlap to circumferentially engage each other to provide a rotationally keyed engagement between the right grip 120 and the right handle 114b. FIGS. 3c and 3d provide further detailed description of this embodiment. FIG. 3d particularly illustrates the nested contour engagement between the notch cut 116 and the bump contour 127 and between the extension 117 and the relief 130. The notch cut 116 may be considered to be a radially and axially inward relief, which correspondingly serves to create the axially projecting semicircular extension portion 117 such that the lower surface 119 extends axially outwardly relative to the upper surface 118. In one embodiment, the right handle 114b may comprise a generally circular cylindrical hollow tube with a septum wall 131 (as shown in FIGS. 3a and 3d) that extends within the semicircular extension 117. The septum wall 131 may also serve to provide radial support to the bump contour 127 of the grip 120. Similarly, the bump contour 127 may be considered as a non-circular portion of the grip 120 that is projecting radially inwardly from the internal sidewall 132 and axially inwardly from the extension 117. In other embodiments, the septum wall 131 may be omitted.

As shown in FIG. 3d, the bump contour 127 also creates a thickened region 125 of the right grip 120 adjacent the outboard end 124. This thickened region 125 also faces upwardly 133 toward the palm of the operator, preferably in the region adjacent the ulnar nerve. The thickened region 125, and its corresponding extra radial thickness of soft material, serves to provide the benefit of additional cushioning and vibration damping to the operator's palm, especially in the sensitive ulnar region in a manner similar to that described in FIGS. 2a-d.

FIGS. 4a-d describe another embodiment of the present invention where the outboard end 145 of the right handle 144b includes a series of circumferentially spaced notches 146 to provide a rotationally keyed engagement with the right grip 150 about the axial axis 14b. Handlebar 140 includes a left handle (not shown), a right handle 144b, and a center portion (not shown) for assembly with a central clamping device (not shown) in the conventional manner. Right handle 144b includes external sidewall 141 and outboard end 145. The notches 146 may be considered to be axially and radially relieved portions of the outboard end 145. Notches 146 may be circumferentially alternated with projections 147 between adjacent notches 146. Projections 147 are shown to extend axially outwardly relative to notches 146. There may be a plurality of these circumferentially spaced projections 147 that are alternately spaced about axial axis 14b, with a plurality of circumferentially spaced notches 146 therebetween.

FIG. 4a shows the right grip assembly 151 prior to its assembly or installation with right handle 144b. The right grip assembly 151 includes the right grip 150 and split collar 80. Right grip 150 includes an inboard end 152 with collar portion 156 extending axially inwardly therefrom, an outboard end 154, and an axially extending opening 158 therein. Opening 158 is a blind opening extending along the axial axis 14b, with an entrance adjacent the inboard end 152, a closed end face 159 adjacent the outboard end 154, and an internal sidewall 160. Further, opening 158 includes a series of circumferentially spaced keys 157 that are alternately spaced about axial axis 14b, with a plurality of circumferentially spaced gaps 155 therebetween. Keys 157 extend axially inwardly from the end face 159 and radially inwardly from internal sidewall 160 (as shown in FIGS. 4a, 4c, and 4d) to provide geometry that may be circumferentially keyed with notches 146 upon assembly with the right handle 144. Notches 146 and keys 157 may both be circumferentially tapered in the axially inboard direction. Split collar 80 is similar to split collar 50 described in FIGS. 2a-e and includes axial opening 82 and clamp screw 81. Split collar 80 is first pre-assembled to the right grip 150, with collar portion 156 extending through opening 82 as shown in FIG. 4c.

Next, the right grip assembly 151 is sleevably assembled to the right handle 144b in direction 148 as shown in FIG. 4b, with the right handle 144b extending within opening 158. As it is advanced in direction 148, the right grip 150 is twisted as required in direction 149 such that the keys 157 are circumferentially aligned with notches 146. With the right grip 150 fully advanced in direction 148, the right handle 144b axially overlaps opening 158. The keys 157 are also axially overlap notches 146 and the tapered contour of the keys 157 are nested and wedged against their respective mating notches 146. This nested and wedged engagement serves as a depth stop to restrict further displacement of the right grip 150 in direction 148 relative to the right handle 144b. Additionally, this nested and wedged engagement serves to reduce any circumferential clearance between the outboard end 145 and the outboard end 154 and thus reduces or eliminates circumferential freeplay or twisting therebetween. The right grip 150 is thus rotationally keyed in direction 149 relative to the right handle 144b. Finally, the clamp screw 81 is threadably tightened to reduce the diameter of opening 82 and to grip the inboard end 152 of the right handle 144b and to axially retain and/or secure the right grip 150 to the right handle 144b. The split collar 80 also serves to circumferentially secure the inboard end 152 to the right handle 144b and to restrict independent rotation in direction 149 therebetween. It is understood that, since there are a plurality of keys 157 and notches 146, the grip 150 may be optionally assembled to the right handle 144b in a variety circumferentially discreet angular orientations corresponding to the variety of engagement options between keys 157 and notches 146. These engagement options may be beneficial to selectively circumferentially align the grip 150 with the right handle 144b.

The projections 147 and corresponding notches 146 may be considered as a non-circular portion of the right handle 144b. Notches 146 are relieved to be radially inboard of the external sidewall 141 and axially inboard of the outboard end 145. Correspondingly, projections 147 project axially outwardly relative to notches 146. Similarly, the keys 157 and gaps 155 may be considered as a non-circular portion of the grip 150. Keys 157 project axially inwardly from closed end 159 and radially inwardly from internal sidewall 160. Correspondingly, gaps 159 project radially inwardly relative to keys 157.

FIGS. 5a-d describe an embodiment of the present invention where the right handle 174b includes a series of circumferentially spaced external splines 177 to provide a rotationally keyed engagement with the right grip 180 about the axial axis 14b. Handlebar 170 includes a left handle (not shown), a right handle 174b, and a center portion (not shown) for assembly with a central clamping device (not shown) in the conventional manner. Right handle 174b includes an external sidewall 171 with external splines 177, and an outboard end 175. External splines 177 may be achieved by hobbing, broaching, milling, molding, knurling or other fabrication process. External splines 177 constitute a series of radially outwardly projecting keys that extend longitudinally and are generally parallel to the axial axis 14b and are circumferentially arranged around the external periphery of the right handle 174b. A plurality of these keys are circumferentially arranged about the axial axis 14b and are alternately spaced with a plurality of corresponding longitudinal gaps 173 circumferentially spaced therebetween.

Figure 5D:
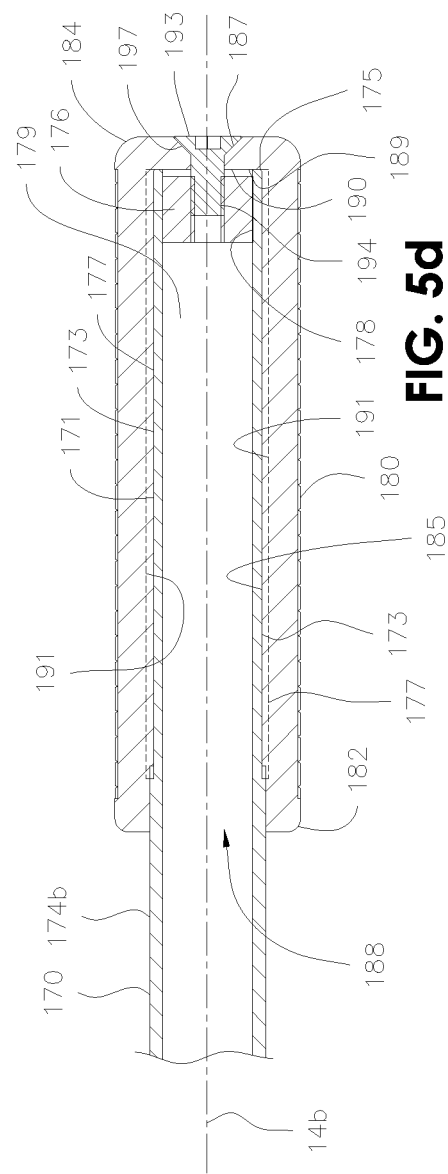
FIG. 5d is a partial orthogonal cross section view of the embodiment of FIG. 5a, taken along 33-33, showing the right grip as fully assembled to the right handle, with the locking screw axially securing the right grip to the right handle.

The right handle 170 has generally hollow tubular geometry to include opening 179 (shown in FIG. 5d). Plug 176 is positioned within the opening 179 and adjacent the outboard end 175 and is secured and/or retained to the right handle 174b by a means such as fasteners, adhesive, or any other means known to a person having ordinary skill in the art. Plug 176 includes an internally threaded hole 178 that is sized and positioned to threadably engage with external threaded screw 193. Screw 193 is configured as a conventional countersink head screw and includes an externally threaded shank 194, a head 195, and a conical transition surface 197 between the head 195 and shank 194.

FIG. 5*a* shows the right grip 180 prior to its assembly and installation with right handle 174*b*. The right grip 180 includes an inboard end 182, outboard end 184, and an axially extending opening 188 with an internal sidewall 185 and end face 190 therein. Opening 188 is a generally blind opening extending along the axial axis 14*b*, with an entrance adjacent the inboard end 182 and a generally closed end 189 adjacent the outboard end 184. Generally closed end 189 includes an end face 190 with a screw hole 186 therethrough, with a countersink 187 to receive screw 193. Further, opening 188 includes a series of circumferentially spaced internal splines 191 that extend longitudinally and are generally parallel to the axial axis 14*b* and are circumferentially arranged around the internal sidewall 185. Splines 191 provide geometry that may be circumferentially keyed with external splines 177 upon assembly with the right handle 174. The internal splines 191 may be achieved by hobbing, broaching, milling, knurling or other fabrication process. Internal splines 191 constitute a series of radially inwardly projecting keys that extend longitudinally and are generally parallel to the axial axis 14*b* and are circumferentially arranged around the interior periphery of the opening 188. A plurality of these keys are circumferentially arranged about the axial axis 14*b* and are alternately spaced with a plurality of corresponding longitudinal gaps 192 circumferentially spaced therebetween.

Next, the right grip 180 is sleevably assembled to the right handle 174*b* in direction 198 as shown in FIGS. 5*b-d*, with the right handle 174*b* extending within opening 188. As the right grip 180 is advanced in direction 198, the internal splines 191 axially overlap and circumferentially engage external splines 177 to create a rotationally keyed engagement between the right grip 180 and the right handle 170. With the right grip 180 fully advanced in direction 198, the internal splines 191 are fully overlapped and engaged to the external splines 177 along substantially the full axial length of the opening 188 as shown in FIGS. 5*b-d*. The right grip 180 is thus rotationally keyed in direction 199 relative to the right handle 174*b*. The end face 190 is now also abutting the outboard end 175 of the right handle 174*b*. During this assembly between the grip 180 and right handle 174*b*, internal splines 191 and external splines 177 may be engaged at a variety of circumferential positions, as dictated by the circumferential pitch of splines 177 and 191. This allows the external surface to the grip 180 to be selectively circumferentially aligned for optimal ergonomics.

The external splines 177 and corresponding gaps 173 may be considered as a non-circular portion of the right handle 174*b*. Gaps 173 are relieved to be radially inboard relative to external splines 177. Correspondingly, internal splines 191 project axially inwardly relative to gaps 192. Similarly, the internal splines 191 and gaps 192 may be considered as a non-circular portion of the grip 150. Internal splines 191 project axially inwardly relative to gaps 192.

Next, screw 193 is assembled through screw hole 186 and the externally threaded shank 194 is threadably engaged with internally threaded hole 178. As the screw 193 is threadably tightened in direction 198, the transition surface 197 abuts the countersink 187 and the closed end 189 is axially sandwiched and clamped between the outboard end 175 and the transition surface 197. Thus, the screw 193 serves to axially secure and retain the right grip 180 to the right handle 174*b* and to limit axial movement therebetween. FIGS. 5*b-d* provide various views to more clearly describe the assembly between the right handle 174*b* and the right grip 180, including screw 193.

The embodiments of FIGS. 2*a-e*, 3*a-d*, and 4*a-d* all utilize a clamp collar to limit axial displacement of the right grip (70, 120, 150) relative to the right handle (64*b*, 114*b*, 144), and also to limit circumferential twisting of the inboard end (72, 122, 152) of the right grip (70, 120, 150) relative to the right handle (64*b*, 114*b*, 144). In contrast, the engagement between external splines 177 and internal splines 191 extends along substantially the full axial length of the right grip 180, which serves to limit circumferential twisting of both the inboard end 182 and outboard end 184 relative to the right handle 174*b*. The screw 193 then serves simply to limit axial displacement of the right grip 180 relative to the right handle 174*b* and to maintain the axially overlapping engagement between external splines 177 and internal splines 191.

FIGS. 6*a-f* describe an embodiment of the present invention where the right handle 214*b* includes a series of circumferentially spaced internal splines 217 to provide a rotationally keyed engagement with the right grip 220 about the axial axis 14*b*. FIG. 6*a* shows the components in exploded view, prior to their assembly. Handlebar 210 includes a left handle (not shown), a right handle 214*b*, and a center portion (not shown) for assembly with a central clamping device (not shown) in the conventional manner. Right handle 214*b* includes an external sidewall 216, outboard end 215, and internal splines 217. The internal splines 217 extend longitudinally in a direction generally parallel to the axial axis 14*b* and are circumferentially arranged around the internal periphery of the right handle 214*b*. The right handle 214*b* has generally hollow tubular geometry to include opening 219. The internal splines 217 may constitute a series of radially inwardly projecting keys that extend longitudinally and are generally parallel to the axial axis 14*b* and are circumferentially arranged around the interior periphery of the opening 219.

FIG. 6*a* shows the right grip 220 prior to its assembly and installation with right handle 214*b* and FIG. 6*b* shows the right grip 220 in greater detail. The right grip 220 includes an inboard end 222 with collar portions 226*a* and 226*b* extending axially inwardly therefrom, and gaps 232*a* and 232*b* (232*b* not shown) therebetween. Right grip 220 also includes an axially extending opening 228 therein, with an internal sidewall 237 and a closed end 229. Opening 228 is a generally blind opening extending along the axial axis 14*b*, with an entrance adjacent the inboard end 222, and a closed end 229 adjacent the outboard end 224. Further, closed end 229 includes a collar 230 within opening 228 that extends axially inwardly from closed end 229 and that includes series of circumferentially spaced external splines 231 that extend longitudinally and are generally parallel to the axial axis 14*b* and are circumferentially arranged around the external periphery of the collar 230. External splines 231 provide geometry that may be circumferentially keyed with internal splines 217 upon assembly with the right handle 214. External splines 231 constitute a series of radially outwardly projecting keys that extend longitudinally and are generally parallel to the axial axis 14*b* and are circumferentially arranged around the external periphery of the collar 230. Split collar 233 includes axial opening 235, with axially extending keys 236*a* and 236*b* therein, and clamp screw 234.

In contrast of the embodiment of FIGS. 5*a-d*, which shows external splines 177 as projecting radially outwardly along the external sidewall 171, FIGS. 6*a-d* show internal splines 217 as projecting radially inwardly along the internal sidewall of opening 219. Further, in contrast to the embodiment of FIGS. 5a-d, which shows internal splines 191 as projecting radially inwardly along the internal sidewall of opening 188, FIGS. 6a-d show collar 230 and external splines 231 as projecting axially inwardly from the closed end 229 of opening 219.

Split collar 233 is first pre-assembled to the right grip 220 to create grip assembly 221, with collar portions 226a and 226b extending to axially overlap opening 235 as shown in FIG. 6c. Keys 236a and 236b of the split collar 233 are circumferentially positioned to axially overlap and circumferentially key within gaps 232a and 232b (232b not shown) respectively. Next, the right grip assembly 221 is sleevably assembled to the right handle 214b in direction 238 as shown in FIGS. 6b-f, with the right handle 214b extending within opening 228. As the right grip 220 is advanced in direction 238, the external splines 231 axially overlap and circumferentially engage internal splines 217 to create a rotationally keyed engagement between the right grip 220 and the right handle 214b. With the right grip 220 fully advanced in direction 238, the external splines 231 are fully overlapped and engaged to the internal splines 217. The right grip 220 is thus rotationally keyed in direction 239 relative to the right handle 214b. The closed end 229 is now also abutting the outboard end 215 of the right handle 214b. In contrast to the embodiment of FIGS. 5a-d, which shows the right grip 180 rotationally engaged to the outer or external surface of the right handle 174b, the embodiment of FIG. 6a-f shows the right grip 220 rotationally engaged to the opening 219 or internal surface of the right handle 214b. During this assembly between the grip 220 and right handle 214b, internal splines 217 and external splines 231 may be engaged at a variety of circumferential positions, as dictated by the circumferential pitch of splines 217 and 231. This allows the external surface to the grip 220 to be selectively circumferentially aligned for optimal ergonomics.

Finally, the clamp screw 234 is threadably tightened to reduce the diameter of opening 235 to radially sandwich and clamp collar portions 226a and 226b to grip the right handle 214b, as shown in FIGS. 6b-f. The split collar 233 thereby serves to axially retain and/or secure the right grip 220 to the right handle 214b. The split collar 233 also serves to circumferentially secure the inboard end 222 to the right handle 214b and to restrict independent rotation in direction 239 therebetween.

FIGS. 7a-f describe an embodiment of the present invention where the right handle 254b includes a spring clip 270 with engagement pins (272a and 272b) that are simultaneously keyed to the both right handle 254b and to the recesses (266a and 266b, respectively) to provide a rotationally engagement with the right grip 260 about the axial axis 14b. Handlebar 250 includes a left handle (not shown), a right handle 254b, and a center portion (not shown) for assembly with a central clamping device (not shown) in the conventional manner. The right handle 254b has generally hollow tubular geometry to include external sidewall 251, outboard end 255, and opening 259 therein. Right handle 254b also includes two cross holes 257a and 257b that oppose each other and extend generally radially through the wall of the right handle 254b to communicate with the interior opening 259 of the right handle 254b.

FIG. 7a shows the right grip 260 prior to its assembly and installation with right handle 254b. The right grip 260 includes an inboard end 262, an outboard end 264, and an axially extending opening 268 therein. Opening 268 is a generally blind opening extending along the axial axis 14b, with an entrance adjacent the inboard end 262, and a closed end 269 adjacent the outboard end 264. Further, the interior side wall 263 of opening 268 includes two opposing recesses 266a and 266b that extend generally radially outwardly therefrom and are sized to receive engagement pins 272a and 272b.

The spring clip 270 includes a U shaped leaf portion 274 and two pins 272a and 272b projecting radially outwardly from respective legs 279a and 279b of leaf portion 274. The spring clip 270 is first squeezed to elastically flex and collapse the leaf portion 274 and to move engagement pins 272a and 272b and legs in directions 275a and 275b respectively. The collapsed spring clip 270 is then inserted into opening 259 in direction 276 and further advanced in direction 276 until engagement pins 272a and 272b are aligned with cross holes 257a and 257b respectively. The spring clip 270 is then released and the stored elastic spring energy of the leaf portion 274 causes engagement pins 272a and 272b to radially spread in directions 278a and 278b respectively, extending through cross holes 257a and 257b respectively, such that they project radially outwardly from the surface of the right handle 254b as shown in FIGS. 7b and 7d. Due to the elastic resilience of the leaf portion 274, pins 272a and 272b may be retracted radially inwardly as desired and may be considered as radially retractable projections of the right handle 254b.

Next, the right grip 260 is sleevably assembled to the right handle 254b in direction 276 as shown in FIGS. 7c, 7e, and 7f, with the right handle 254b extending within opening 268. As the right grip 260 is advanced in direction 276, the pins 272a and 272b are partially retracted, elastically displacing engagement pins 272a and 272b in directions 275a and 275b respectively, to allow the interior wall 263 of the right grip 260 to advance further in direction 276 until the outboard end 255 abuts the closed end 269 and the engagement pins 272a and 272b are aligned to snap radially outwardly in directions 278a and 278b respectively such that they radially overlap and engage recesses 266a and 266b respectively as shown in FIGS. 7c and 7f.

The engagement pins 272a and 272b are respectively keyed to the cross holes 257a and 257b and to the recesses 266a and 266b to create an axially and rotationally keyed engagement between the right grip 260 and the right handle 254b. Thus the spring clip 270 also serves to secure and retain the right grip 260 to the right handle 254b and to limit axial movement therebetween in the direction opposite of direction 276, and also limit the grip 260 from rotational movement in direction 277.

FIGS. 8a-c describe an embodiment of the present invention that includes an intermediate keying element (i.e. connector 300) where the right handle 284b is rotationally keyed to the intermediate keying element and the intermediate keying element is rotationally keyed to the right grip 290. The right handle 284b is similar to the right handle 144b of FIGS. 4a-d. The outboard end 285 of the right handle 284b includes a series of circumferentially spaced notches 286 to provide a rotationally keyed engagement with the connector 300 about the axial axis 14b. Handlebar 280 includes a left handle (not shown), a right handle 284b, and a center portion (not shown) for assembly with a central clamping device (not shown) in the conventional manner. Right handle 284b includes an external sidewall 289, outboard end 285, and notches 286 therein. The axially-extending notches 286 are circumferentially alternated with axially-extending projections 287 between adjacent notches 286. Notches 286 provide geometry that may be circumferentially keyed with projections 302 of the connector 300 upon assembly with the right grip 290. Projections 287 are shown to extend axially outwardly. There are a plurality of these circumferentially spaced projections 287 about axial axis 14b, with a plurality of circumferentially spaced notches 286 therebetween.

FIG. 8a shows the right grip assembly 291 prior to its assembly and installation with right handle assembly 281. The right grip assembly 291 includes the right grip 290 and split collar 233. Right grip 290 includes inboard end 292 with collar portions 296a and 296b extending axially inwardly therefrom, outboard end 294, and an axially extending opening 298 therein. Opening 298 is a blind opening extending along the axial axis 14b, with an entrance adjacent the inboard end 292 and a closed end 299 adjacent the outboard end 294. Opening 298 also includes an internal sidewall 307 and a series of circumferentially spaced internal splines 297 that extend longitudinally inwardly from the closed end 299 and that are generally parallel to the axial axis 14b. These internal splines 297 are circumferentially arranged around the internal periphery of the opening 298 at a location adjacent the outboard end 294. Splines 297 provide geometry that may be circumferentially keyed with external splines 304 of the connector 300 upon assembly with the right handle assembly 281. Split collar 233 is identical to that described in FIGS. 6a-f and includes axial opening 235, with axially extending keys 236a and 236b therein, and clamp screw 234.

Right handle assembly 281 is comprised of the right handle 284b and the connector 300. The connector 300 includes a collar 306 with a series of circumferentially spaced projections 302 that extend axially inwardly and are arranged circumferentially about axial axis 14b, with reliefs 303 circumferentially spaced between adjacent projections 302. Reliefs 303 provide geometry that may be circumferentially keyed with projections 287 upon assembly with the right handle 284b. It is preferable that notches 286 and projections 302 are both circumferentially tapered in the axially inboard direction. Connector 300 also includes a series of circumferentially spaced external splines 304 that extend longitudinally and are generally parallel to the axial axis 14b and are circumferentially arranged around the external periphery of the connector 300. External splines 304 provide geometry that may be circumferentially keyed with internal splines 297 upon assembly with the right grip 290.

Split collar 233 is first pre-assembled to the right grip 290 to create grip assembly 291, with collar portions 296a and 296b extending to axially overlap opening 235 as shown in FIG. 8b. Keys 236a and 236b of the split collar 233 are circumferentially positioned to reside within gaps 295a and 295b (not shown) respectively. Next, connector 300 is pre-assembled to right handle 284b in direction 308 to create right handle assembly 281, with collar 306 axially overlapping and piloted within opening 288, and with projections 302 axially overlapping and nested with corresponding notches 286. The connector 300 is now radially aligned and rotationally keyed (about axial axis 14b) relative to the right handle 284b. Next, the right grip assembly 291 is sleevably assembled to the right handle assembly 281 in direction 308 as shown in FIGS. 8b-c, with the right handle assembly 281 extending within opening 298. As the right grip assembly 291 is advanced in direction 308, the external splines 304 axially overlap and engage internal splines 297 to create a rotationally keyed spline engagement between the right grip 290 and the right connector 300. With the right grip assembly 291 fully advanced in direction 308, the external splines 304 are fully overlapped and engaged to the internal splines 297. The outboard end 294 of the right grip 290 is thus rotationally keyed in direction 309 relative to the right handle 284b. The closed end 299 is now also abutting the outboard end 305 of the right connector 300. It may be viewed that the circumferential engagement between the right handle 284b and connector 300 is similar to that of the right handle 144b and the grip 150 of FIGS. 4a-d. It may also be viewed that the splined circumferential engagement between the connector 300 and the grip 290 is similar to the splined circumferential engagement between the right handle 174b and the grip 180 of FIGS. 5a-d.

The circumferential pitch of the engagement between internal splines 297 and external splines 304 may be different than the circumferential pitch between projections 302 and notches 286. This may create a circumferential Vernier effect, where the right grip 290 may be selectively assembled to the right handle 284b in a variety of relative circumferential position.

Finally, the clamp screw 234 is threadably tightened to reduce the diameter of opening 235 to radially sandwich and clamp collar portions 296a and 296b and to grip the right handle 284b, as shown in FIGS. 8b-c. The split collar 233 thereby serves to axially retain and/or secure the right grip 290 to the right handle 284b. The split collar 233 also serves to circumferentially secure the inboard end 292 to the right handle 284b and to restrict independent rotation in direction 309 therebetween.

While the above description contains many specificities, these should not be construed as limitations on the scope of the invention, but rather as exemplifications of embodiments thereof. For example:

Several of the embodiments describe a grip being assembled to the right handle of the handlebar. It is understood that a similar arrangement as described herein may be utilized to secure and circumferentially engage a grip onto the left handle of the handlebar.

While the embodiments described herein refer to a conventional handlebar arrangement that includes two handle portions: a left handle portion and a right handle portion, it is understood that the present invention is alternatively applicable to a handlebar with only a single handle portion. As a further alternative, the present invention is applicable to handlebars with a number of handle portions (and corresponding grips) that are greater than two.

The embodiments herein describe a generally straight axial assembly direction between a grip and a handle portion. It is also envisioned that the grip may be assembled to the handle portion in a manner that includes a circumferential twisting component of motion as well. For example, the external splines 177 and internal splines 191 may alternatively be configured as helical splines about axial axis 14b, which would require the grip to be rotated as it is axially assembled to the right handle.

The embodiments herein include a means to axially secure the grip to the right handle, such as a split collar (80, 233) or a screw (193) or projections (272a, 272b). These means to secure are merely representative of a wide range of alternate securing means well known in industry. As a further alternative, such an external securing means may be omitted and the means to axially secure the grip to the right may simply be a frictional gripping fit between the opening of the grip and the right handle.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

This invention has many advantages. One advantage is that engaging geometry provides a means that prevents the right and left grips from rotating with respect to the handle bar. Another advantage is that due to some embodiments of the engaging geometry, the right and left grips have greater cushioning characteristics, especially where a rider's ulnar nerve region of his or her hands will rest on the grips, thus preventing numbness, fatigue, and injury.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A grip comprising:
   a grip central opening;
   a grip engaging geometry located in the grip central opening; and
   wherein the grip engaging geometry is configured to engage with a handlebar engaging geometry such that the grip will be prevented from rotating about a handle portion of a handlebar when the grip has been slid onto the handle portion;
   wherein the grip includes a first portion that is axially coincident and circumferentially offset from a second portion thereof and wherein the first portion has a greater radial thickness than the second portion, wherein the first portion and the second portion are configured to be grasped by a user; and
   wherein the engagement between the grip engaging geometry and the handlebar engaging geometry serves to maintain the circumferential orientation of the first portion relative to the handlebar.

2. The grip of claim 1,
   wherein the grip engaging geometry is shaped into a wedge contour planar surface.

3. The grip of claim 2,
   wherein the first portion the grip is located above the grip engaging geometry, such that greater radial thickness of the first portion provides additional cushioning to a rider's hand relative to the second portion.

4. The grip of claim 3, where the upper radial thickness of the grip is located on the top half of the grip.

5. The grip of claim 1,
   where the handlebar engaging geometry is in the form of a notch therein, where a portion of the handle portion has been removed adjacent an axially outboard end of the handle portion.

6. The grip of claim 5,
   wherein the grip engaging geometry includes a grip engagement face and wherein said grip central opening includes a circular cylindrical portion axially inward of said grip engagement face, and wherein a first radial thickness of the grip in a thickened region adjacent the grip engagement face is greater than a second radial thickness adjacent the cylindrical portion such that the first, radial thickness provides greater cushioning to a rider's hand relative to the second radial thickness.

7. The grip of claim 6, where the second radial thickness is positioned to be adjacent the ulnar nerve volume of the rider's hand.

8. A handlebar and grip system comprising:
   a handlebar, the handlebar comprising:
      a center portion;
      a handle attached to a first end of the center portion, the handle comprising:
         a handle outboard end extending along an axial axis;
         a handle engaging geometry located on the handle outboard end, the handle engaging geometry is noncircular about the axial axis;
   a grip configured to slide onto the handle outboard end, the grip comprising:
      a grip central opening;
      a grip engaging geometry located in the right grip central opening;
      a first portion that is circumferentially offset and axially coincident relative to a second portion thereof, wherein the first portion has a greater radial thickness than the second portion, wherein the first portion and the second portion are configured to be grasped by a user;
   wherein, with the handle positioned within the grip central opening, the grip is circumferentially keyed to the handle to limit rotation therebetween about the axial axis.

9. The handlebar and grip system of claim 8, further comprising:
   the handle engaging geometry comprising:
      the handle outboard end which has been shaped to form a wedge shaped planar handle outboard surface, where the wedge shaped planar handle outboard surface makes an angle with handle axis that is not 0°, 90° or 180°;
      a grip engagement face located in the grip central opening, and where the grip engagement face is shaped such that when the grip is slid onto the handle until the grip engagement face mates with the wedge shaped planar handle outboard surface, the grip is circumferentially keyed to the wedge shaped planar handle outboard surface such that the grip is prevented from rotating with respect to the handle about the axial axis.

10. The handlebar grip system of claim 9, further comprising:
   an upper radial thickness of the grip located above the right grip engagement face, where the upper radial thickness is greater than a lower radial thickness of the grip located below the upper radial thickness such that the right upper radial thickness provides additional cushioning to a rider's hand.

11. The handlebar grip system of claim 9, further comprising:
   an upper surface of the handle located above the axial axis of the handle when the handlebar is installed on a bicycle;
   a lower surface of the handle located below the axial axis of the handle when the handlebar is installed on the bicycle;

wherein the lower surface of the handle extends farther towards the axially outboard end of the handle than the upper surface of the handle.

12. The handlebar and grip system of claim 8, further comprising:
the handle engaging geometry comprising:
a handle outboard end that has been shaped to form a handle notch, where a portion of a top portion of the handle has been removed a distance away from the outboard end, and a lower portion of the handle has been left intact;
a grip engagement face located in the grip central opening adjacent to the axially outboard end of the grip, and where the grip engagement face is shaped to receive the handle notch, such that when the grip is slid onto the handle until the grip engagement face mates with the handle notch, the grip engagement face is circumferentially keyed to the handle notch and the grip is prevented from rotating with respect to the handle about the axial axis.

13. The handlebar grip system of claim 12,
wherein the first portion is located above an axial centerline of the grip, such that the greater radial thickness of the first portion provides additional cushioning to a rider's hand relative to the second portion.

14. The handlebar and grip system of claim 8, wherein said handle is a right handle and said grip is a right grip, and the handlebar and grip system further comprises:
a left handle attached to a second end of the center portion, the left handle comprising:
a left handle outboard end extending along a left axial axis;
a left handle engaging geometry located on the second handle outboard end, the left handle engaging geometry is noncircular about said left axial axis;
a left grip configured to slide onto the left handle outboard end, the left grip comprising:
a left grip central opening;
a left grip engaging geometry located in the left grip central opening;
a left first portion that is circumferentially offset and axially coincident relative to a left second portion thereof, wherein the left first portion has a greater radial thickness than the left second portion, wherein the left first portion and the left second portion are configured to be grasped by a user;
wherein, with the left handle positioned within the left grip central opening, the left grip is circumferentially keyed to the left handle to limit rotation therebetween about the left axial axis.

15. A handlebar comprising:
a center portion;
a handle attached to a first end of the center portion, the handle comprising:
a handle outboard end;
wherein the handle includes a circular cylindrical portion extending along an axial axis and a handle engaging geometry that is noncircular about the axial axis;
wherein the handle engaging geometry includes a notch that is radially inwardly relieved relative to the circular cylindrical portion;
wherein the handle engaging geometry is configured to engage with a grip engaging geometry of a mating grip such that the grip will be prevented from rotating about the axial axis relative to the handlebar with the handle positioned within the opening of the grip.

16. The handlebar of claim 15, wherein said handle is a right handle and said grip is a right grip, and the handlebar of claim 15 further comprises:
a left handle attached to a second end of the center portion, the left handle comprising:
a left handle outboard end;
wherein the left handle includes a left circular cylindrical portion extending along a left axial axis and a left handle engaging geometry that is noncircular about the left axial axis;
wherein the left handle engaging geometry includes a left notch that is radially inwardly relieved relative to the left circular cylindrical portion;
wherein the left handle engaging geometry is configured to engage with a grip engaging geometry of a mating left grip such that the left grip will be prevented from rotating about the left axial axis relative to the handlebar with the left handle positioned within the opening of the left grip.

17. The handlebar of claim 15, further comprising:
an upper surface of the handle located above the axial axis of the handle when the handlebar is installed on a bicycle;
a lower surface of the handle located below the axial axis of the handle when the handlebar is installed on the bicycle;
wherein the lower surface of the handle extends farther toward the axially outboard end of the handle than the upper surface of the handle.

\* \* \* \* \*